United States Patent
Griess et al.

(10) Patent No.: US 11,820,100 B2
(45) Date of Patent: Nov. 21, 2023

(54) LAMINATED METALLIC STRUCTURES

(71) Applicant: The Boeing Company, Chicago, IL (US)

(72) Inventors: Kenneth H. Griess, Kent, WA (US); Gary E. Georgeson, Tacoma, WA (US)

(73) Assignee: The Boeing Company, Arlington, VA (US)

( * ) Notice: Subject to any disclaimer, the term of this patent is extended or adjusted under 35 U.S.C. 154(b) by 25 days.

(21) Appl. No.: 17/481,491

(22) Filed: Sep. 22, 2021

(65) Prior Publication Data

US 2022/0001641 A1 Jan. 6, 2022

Related U.S. Application Data

(62) Division of application No. 16/377,664, filed on Apr. 8, 2019, now Pat. No. 11,155,056.

(51) Int. Cl.
| | |
|---|---|
| *B32B 1/00* | (2006.01) |
| *B32B 7/12* | (2006.01) |
| *B32B 15/01* | (2006.01) |
| *B32B 38/18* | (2006.01) |
| *B32B 37/12* | (2006.01) |

(52) U.S. Cl.
CPC ............. *B32B 1/00* (2013.01); *B32B 7/12* (2013.01); *B32B 38/1866* (2013.01); *B32B 15/01* (2013.01); *B32B 37/12* (2013.01); *B32B 2037/1253* (2013.01); *B32B 2311/00* (2013.01); *Y10T 428/12* (2015.01)

(58) Field of Classification Search
CPC .......... B32B 38/1866; B32B 1/04; B32B 7/12
See application file for complete search history.

(56) References Cited

U.S. PATENT DOCUMENTS

| | | | |
|---|---|---|---|
| 5,074,687 | A | 12/1991 | Gugel et al. |
| 8,652,606 | B2 | 2/2014 | Griess et al. |
| 8,894,801 | B2 | 11/2014 | Griess et al. |
| 8,993,084 | B2 | 3/2015 | Griess et al. |
| 9,441,652 | B2 | 9/2016 | Griess et al. |
| 9,505,177 | B2 | 11/2016 | Fujioka et al. |
| 9,522,512 | B2 | 12/2016 | Georgeson et al. |
| 9,919,507 | B2 | 3/2018 | Georgeson et al. |
| 10,112,373 | B2 | 10/2018 | Griess et al. |

(Continued)

FOREIGN PATENT DOCUMENTS

| | | |
|---|---|---|
| CN | 1264333 A | 8/2000 |
| CN | 101522518 A | 9/2009 |
| CN | 103068565 A | 4/2013 |

(Continued)

OTHER PUBLICATIONS

China National Intellectual Property Administration, Office Action, App. No. 202010264413.6 (dated Sep. 23, 2023).

*Primary Examiner* — Adam Krupicka
(74) *Attorney, Agent, or Firm* — Walters & Wasylyna LLC

(57) ABSTRACT

A laminated metallic structure includes preformed metallic sheets of graduated three-dimensional sizes. The preformed metallic sheets have a three-dimensional shape and are nested together to form a preform. The preformed metallic sheets in the preform are bonded together to form a three-dimensional body, having a near-net three-dimensional shape.

20 Claims, 20 Drawing Sheets

(56) References Cited

U.S. PATENT DOCUMENTS

2014/0030478 A1* 1/2014 Wittenberg ............... B32B 1/04
156/196

FOREIGN PATENT DOCUMENTS

| | | |
|---|---|---|
| CN | 103568446 A | 2/2014 |
| EP | 0 473 843 | 3/1992 |
| EP | 0 749 825 | 12/1996 |
| GB | 635823 A | 4/1950 |
| WO | WO 92/21489 | 12/1992 |
| WO | WO 2008/026921 | 3/2008 |

* cited by examiner

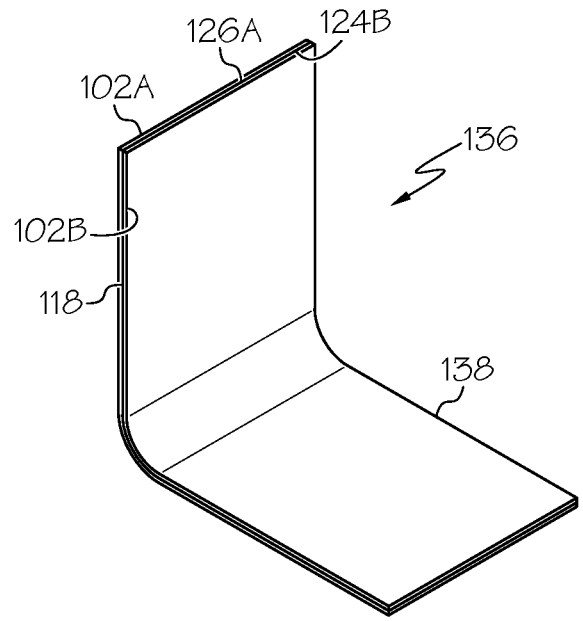
FIG. 4
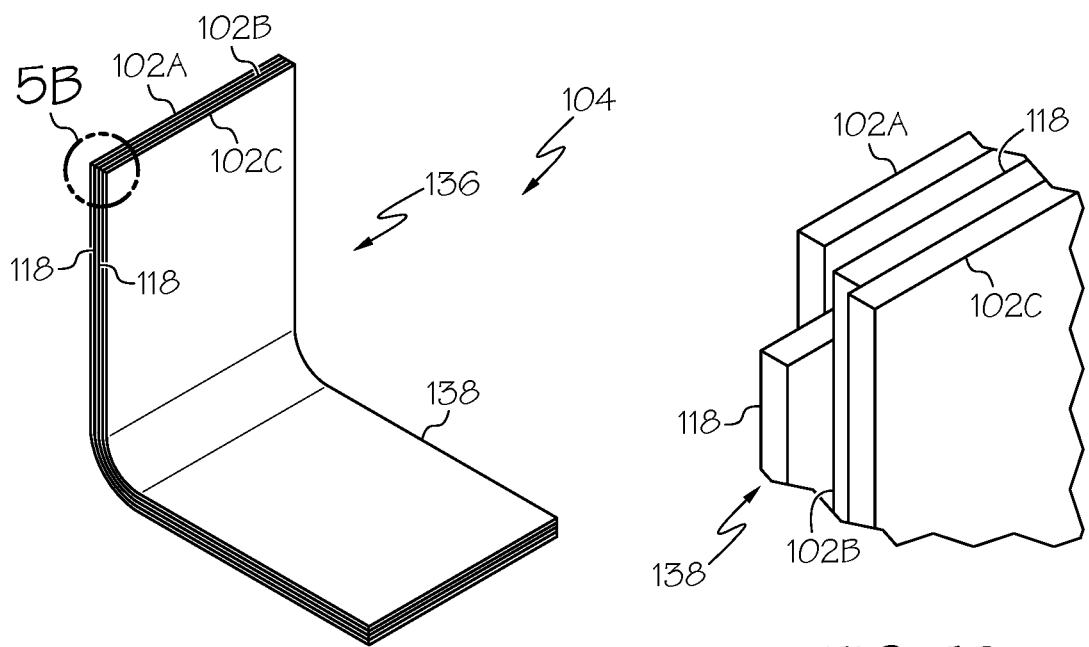
FIG. 5A
FIG. 5B

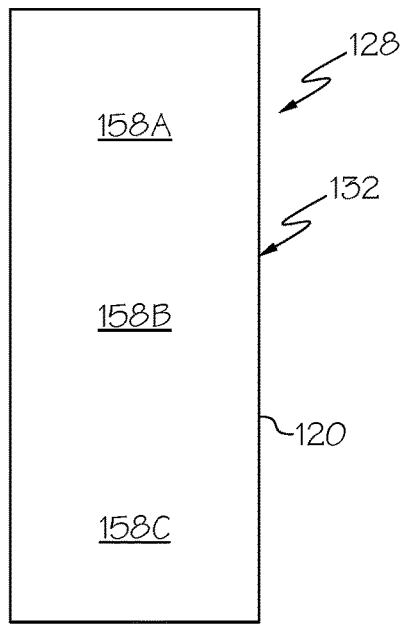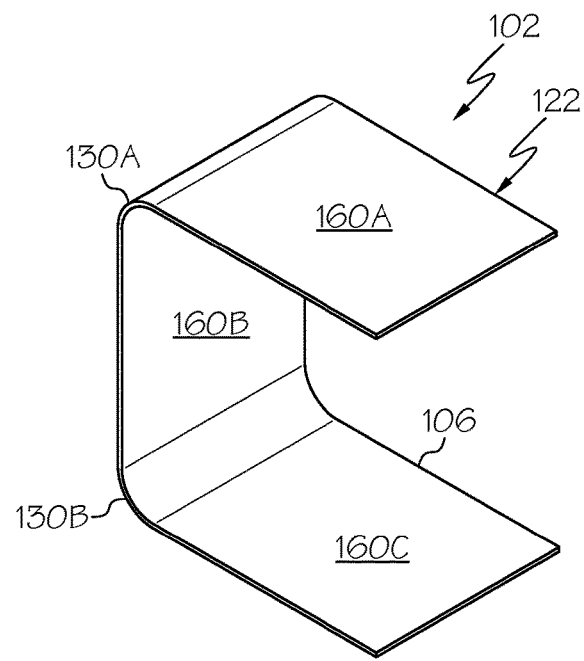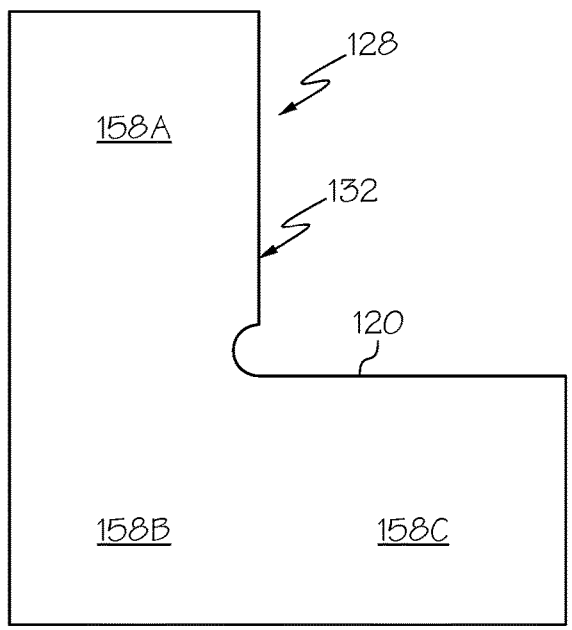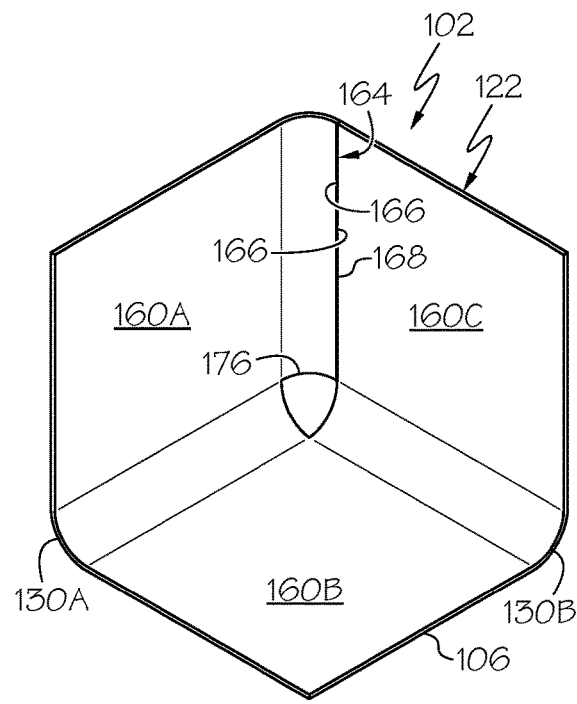
FIG. 7A
FIG. 7B
FIG. 8A
FIG. 8B

LAMINATED METALLIC STRUCTURES

PRIORITY

This application is a divisional of U.S. Ser. No. 16/377,664 filed on Apr. 8, 2019.

FIELD

The present disclosure is generally related to laminated structures and, more particularly, to laminated metallic structures formed of preformed metallic sheets in a nested arrangement and methods of making the same.

BACKGROUND

Metallic laminates are made up of thin sheets of metallic material that are bound together by an adhesive to produce a structure. A laminated metallic structure may be preferable over a monolithic metallic structure because of improved characteristics with regard to strength, damage tolerance, and lower density. However, it can be difficult to form complex shapes from metallic laminates. For example, forming a metallic laminate into a complex shape can degrade the bond around locations where bending occurs and can introduce undesirable internal strain imbalances between layers. One technique to overcome these problems is to perform a series of steps that require curing the adhesive at a temperature that does not affect the metallic material then reheating the cured laminate to a temperature that allows bending without affecting the adhesive. Such a process is complex, costly, and time consuming. Accordingly, those skilled in the art continue with research and development efforts in the field of laminated metallic structures and, as such, apparatuses and methods, intended to address the above-identified concerns, would find utility.

SUMMARY

The following is a non-exhaustive list of examples, which may or may not be claimed, of the subject matter according to the present disclosure.

In an example, a disclosed method of forming a laminated metallic structure includes steps of: (1) providing a first preformed metallic sheet having a three-dimensional shape of a first graduated three-dimensional size; (2) providing a second preformed metallic sheet having the three-dimensional shape of a second graduated three-dimensional size; (3) nesting the second preformed metallic sheet in the first preformed metallic sheet; and (4) bonding the first preformed metallic sheet and the second preformed metallic sheet together.

In an example, a disclosed method of forming an attachment fitting for a structure includes steps of: (1) providing a plurality of preformed metallic sheets having a three-dimensional shape of graduated three-dimensional sizes; (2) nesting the plurality of preformed metallic sheets one inside another to form a preform; (3) bonding the preform together to form a three-dimensional body having a near net three-dimensional shape; and (4) machining the three-dimensional body to form the attachment fitting having a final three-dimensional shape.

In an example, a disclosed laminated metallic structure includes a plurality of preformed metallic sheets of graduated three-dimensional sizes having a three-dimensional shape nested together to form a preform, wherein the preform is bonded together to form a three-dimensional body having a near net three-dimensional shape.

Other examples of the disclosed plug gauge and method will become apparent from the following detailed description, the accompanying drawings and the appended claims.

BRIEF DESCRIPTION OF THE DRAWINGS

FIG. 4 is a schematic, perspective view of an example of a preform formed of the first and second preformed metallic sheets of FIGS. 2 and 3;

FIG. 5A is a schematic, perspective view of an example of a preform formed of three preformed metallic sheets;

FIG. 5B is a schematic, perspective view of an example of a portion of the preform of FIG. 5A;

FIG. 7A is a schematic illustration of an example of a blank-metallic sheet;

FIG. 7B is a schematic illustration of an example a preformed metallic sheet formed from the blank-metallic sheet of FIG. 7A;

FIG. 8A is a schematic illustration of an example of a blank-metallic sheet;

FIG. 8B is a schematic illustration of an example of a preformed metallic sheet formed from the blank-metallic sheet of FIG. 8A;

DETAILED DESCRIPTION

Figure 1:
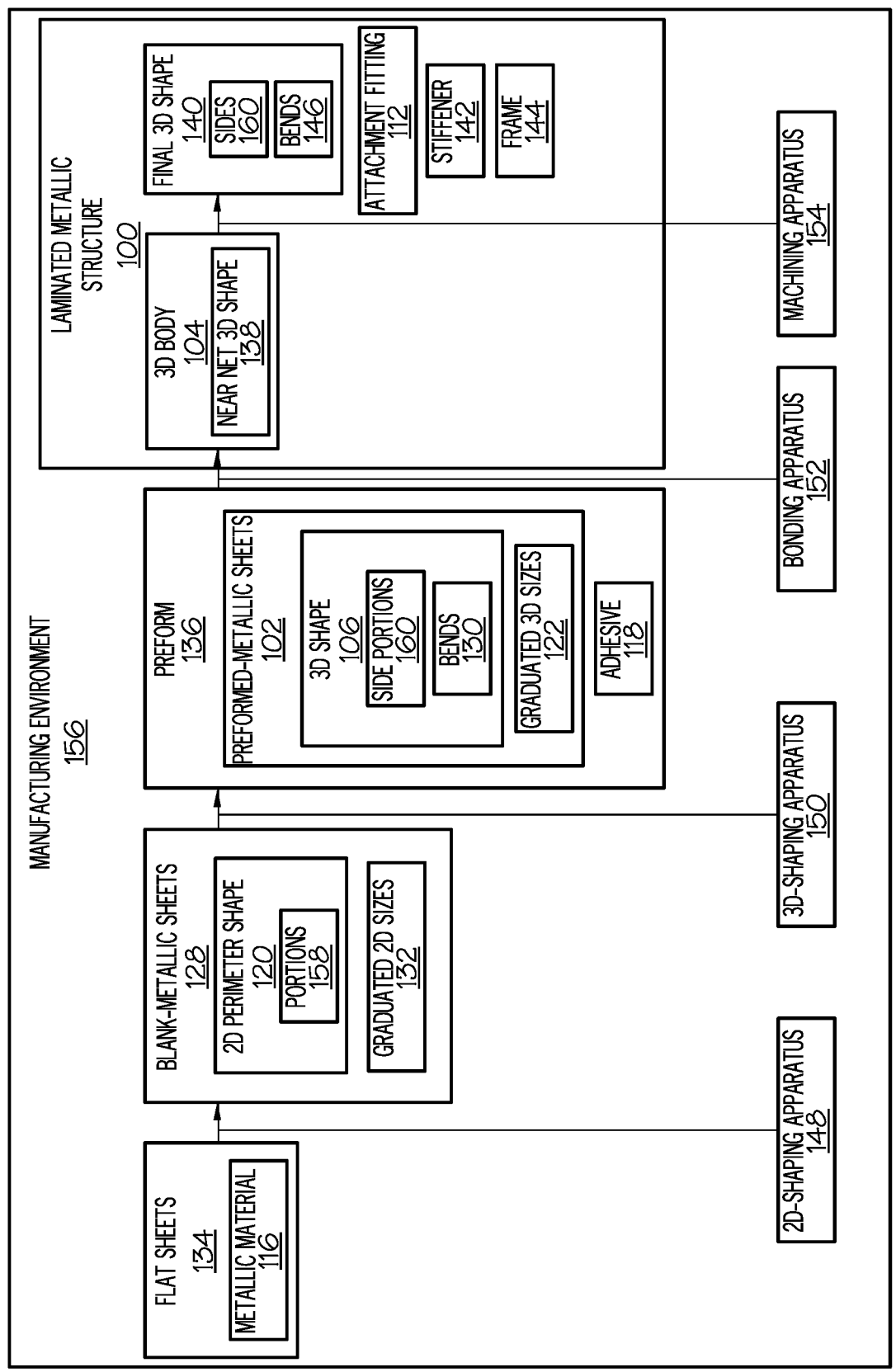
FIG. 1 is a schematic block diagram of an example of a manufacturing environment for making the disclosed laminated metallic structure.

The following detailed description refers to the accompanying drawings, which illustrate specific examples described by the present disclosure. Other examples having different structures and operations do not depart from the scope of the present disclosure. Like reference numerals may refer to the same feature, element, or component in the different drawings.

Illustrative, non-exhaustive examples, which may be, but are not necessarily, claimed, of the subject matter according the present disclosure are provided below. Reference herein to "example" means that one or more feature, structure, element, component, characteristic, and/or operational step described in connection with the example is included in at least one embodiment and/or implementation of the subject matter according to the present disclosure. Thus, the phrases "an example," "another example," "one or more examples," and similar language throughout the present disclosure may, but do not necessarily, refer to the same example. Further, the subject matter characterizing any one example may, but does not necessarily, include the subject matter characterizing any other example. Moreover, the subject matter characterizing any one example may be, but is not necessarily, combined with the subject matter characterizing any other example.

Referring generally to FIGS. 1-27, by way of examples, the present disclosure describes laminated metallic structures and methods of making the same. More specifically, the present disclosure describes attachment fittings for a structure formed from the laminated metallic structure. The disclosed laminated metallic structure provides numerous benefits over a structure formed from a monolithic metallic material. For example, the laminated metallic structure may have improved characteristics as compared to a structure having an equivalent three-dimensional shape that is machined from a monolithic metallic material. As an example, the laminated metallic structure may have increased strength compared to the monolithic metallic structure. As another example, the laminated metallic structure may have a lower density and, thus, a lighter weight compared to the monolithic metallic structure, which may be particularly beneficial in an aerospace application. As another example, the laminated metallic structure may have improved damage tolerance compared to the monolithic metallic structure. Specifically, the laminated metallic structure may have increased resistance to crack propagation compared to the monolithic metallic structure because a crack must initiate through each layer of the laminated metallic structure. As another example, methods of making the laminated metallic structure may generate less material waste compared to a subtractive machining operation used to make the monolithic metallic structure.

Referring generally to FIGS. 1-25, examples of a laminated metallic structure 100 are disclosed. The laminated metallic structure 100 includes a plurality of preformed metallic sheets 102 of graduated three-dimensional sizes 122 having a three-dimensional shape 106. The plurality of preformed metallic sheets 102 is nested together to form a preform 136. The preform 136 is bonded together to form a three-dimensional body 104 having a near net three-dimensional shape 138.

Throughout the present disclosure, an individual preformed metallic sheet of the plurality of preformed metallic sheets 102 may be identified generally as one (e.g., each one, an adjacent one, a first one, a second one, etc.) of the plurality of preformed metallic sheets 102 or simply as the preformed metallic sheet 102. Additionally, throughout the present disclosure, an individual preformed metallic sheet of the plurality of preformed metallic sheets 102 may be identified specifically as a first preformed metallic sheet 102A, a second preformed metallic sheet 102B, a third preformed metallic sheet 102C, etc. Unless otherwise indicated, the terms "first," "second," etc. are used herein merely as labels, and are not intended to impose ordinal, positional, or hierarchical requirements on the items to which these terms refer. Moreover, reference to a "second" item does not require or preclude the existence of lower-numbered item (e.g., a "first" item) and/or a higher-numbered item (e.g., a "third" item).

As used herein, the term "graduated" has its ordinary meaning as known to those skilled in the art and refers to items being characterized by or arranged in degrees, successively, as according to size. For example, a second graduated size is a degree smaller (or a degree large) than a first graduated size, a third graduated size is a degree smaller (or a degree larger) than a second graduated size, etc. As used herein, the term "size" has its ordinary meaning as known to those skilled in the art and refers to the spatial dimensions and/or proportions of an item.

As used herein, the terms "nested," "nesting," and similar terms have their ordinary meaning as known to those skilled in the art and refer to similar objects of graduated sizes being placed one inside the other. For example, a second item is nested in a first item when an outer periphery face (e.g., an exterior or outwardly facing major surface) of the second item is nested with respect to an inner periphery face (e.g., an interior or inwardly facing major surface) of the first item. As illustrated in FIGS. 2-4, in an example, the first preformed metallic sheet 102A includes a first outer periphery face 124A and a first inner periphery face 126A that is opposite to the first outer periphery face 124A. The second preformed metallic sheet 102B includes a second outer periphery face 124B and a second inner periphery face 126B that is opposite to the second outer periphery face 124B. As used herein, the term "periphery face" refers to a major surface of an item that is bound by a perimeter side, or edge, of the item. As illustrated in FIG. 4, the second preformed metallic sheet 102B is nested in the first preformed metallic sheet 102A when the second preformed metallic sheet 102B is placed in an open region at least partially defined by the first inner periphery face 126A of the first preformed metallic sheet 102A and the second outer periphery face 124B is positioned in a face-to-face relationship relative to first inner periphery face 126A.

Referring to FIG. 1, in one or more examples, the three-dimensional body 104 is machined into a final three-dimensional shape 140. As an example, the three-dimensional body 104, having the near net three-dimensional shape 138, is machined to form the laminated metallic structure 100 having the final three-dimensional shape 140.

Figures 6A, 6B:
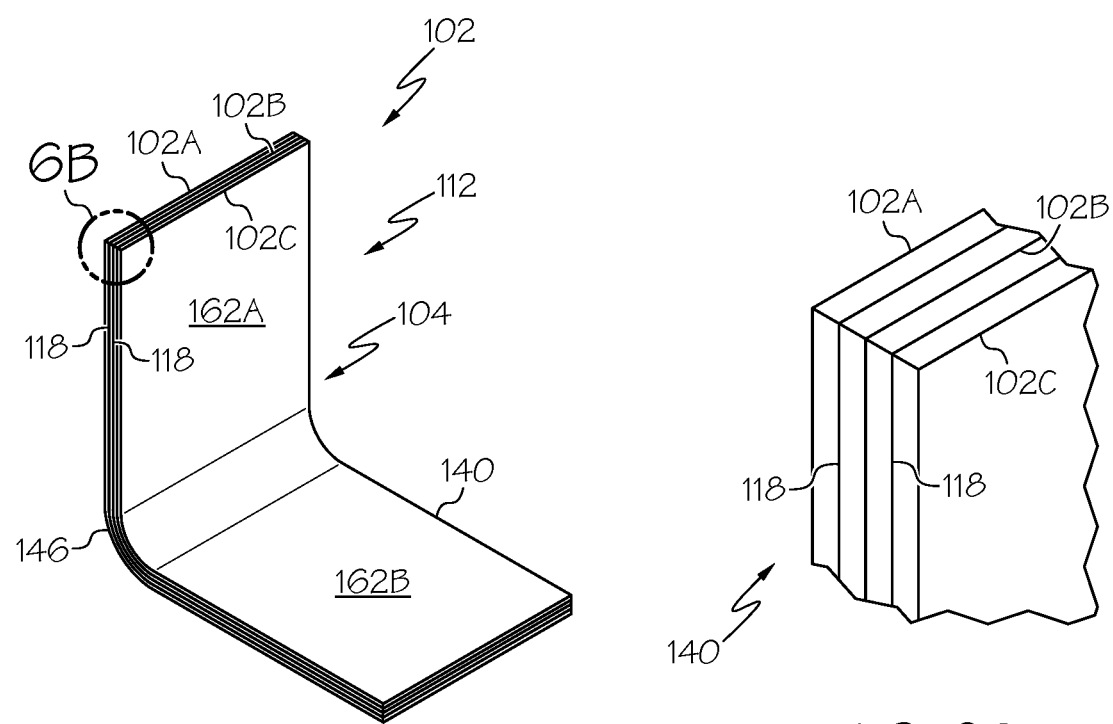
FIG. 6A is a schematic, perspective view of an example of the laminated metallic structure of FIG. 1.
FIG. 6B is a schematic, perspective view of an example of a portion of the laminated metallic structure of FIG. 6A.

As used herein, the term "near net shape," in reference to a near net three-dimensional shape, has its ordinary meaning as known to those skilled in the art and refers to the initial production of an item being very close to the final (net) shape of the item, thus, reducing the need for finishing (e.g., machining or grinding) operations. As used herein, the term "final shape," in reference to a final three-dimensional shape, has its ordinary meaning as known to those skilled in the art and refers to the finished, or net, shape of the item. In an example, as illustrated in FIGS. 5A, the three-dimensional body 104 formed by the bonded preform 136 (e.g., the plurality of preformed metallic sheets 102 bonded together) has the near net three-dimensional shape 138. As illustrated in FIG. 5B, perimeter sides, or edges, of each one of the plurality of preformed metallic sheets 102 (identified individually in FIG. 5B as first preformed metallic sheet 102A, second preformed metallic sheet 102B, and third preformed metallic sheet 102C) are close to their final configuration or shape. As illustrated in FIG. 6A, the three-dimensional body 104 may be machined to produce the laminated metallic structure 100 in its final production form (e.g., as an attachment fitting 112) having the final three-dimensional shape 140. As illustrated in FIG. 6B, the perimeter sides, or edges, of each one of the plurality of preformed metallic sheets 102 (identified individually in FIG. 6B as first preformed metallic sheet 102A, second preformed metallic sheet 102B, and third preformed metallic sheet 102C) machined to their final configuration or shape.

Referring to FIGS. 1, 6A, 10-12, 17, 18, 21, 22, and 25, in an example, the laminated metallic structure 100 is an attachment fitting 112 of a structure 114 (FIGS. 17, 18, 21, and 25). In an example, the attachment fitting 112 is used to connect a secondary structure 184 (FIGS. 17 and 21), or other object, to the underlying, primary structure (i.e., the structure 114).

Figure 10:
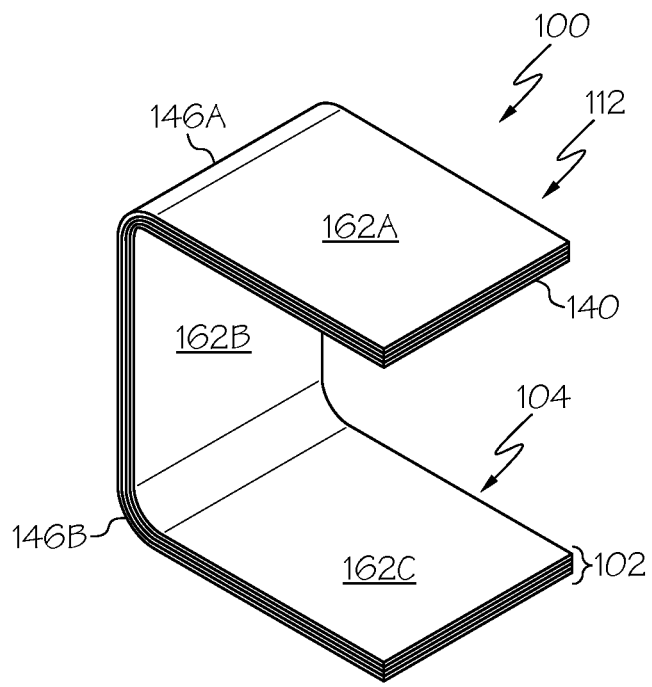
FIG. 10 is a schematic, perspective view of an example of the laminated metallic structure.
Figure 11:
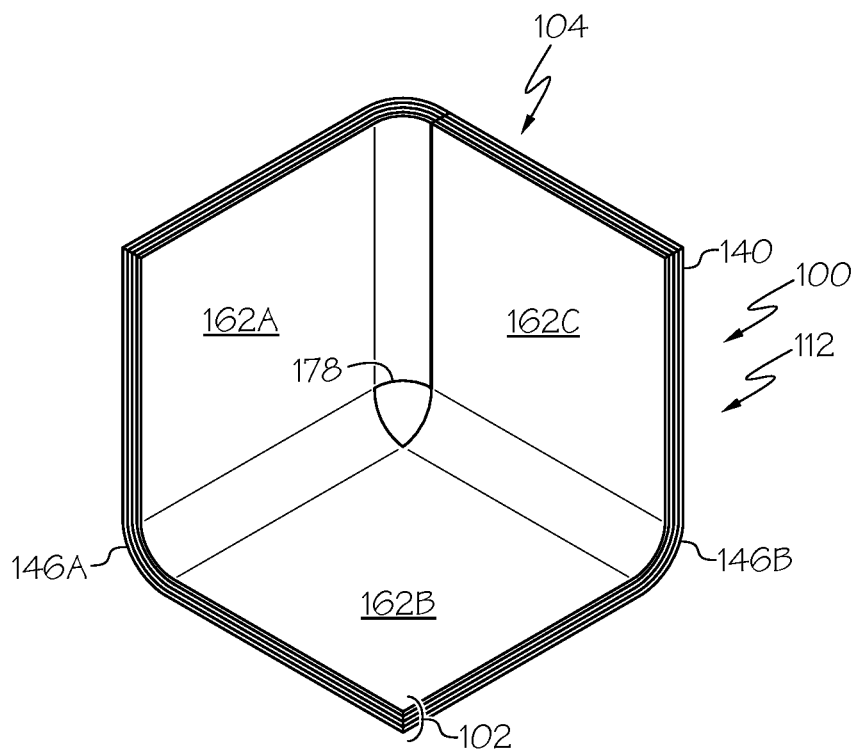
FIG. 11 is a schematic, perspective view of an example of the laminated structure.
Figure 12:
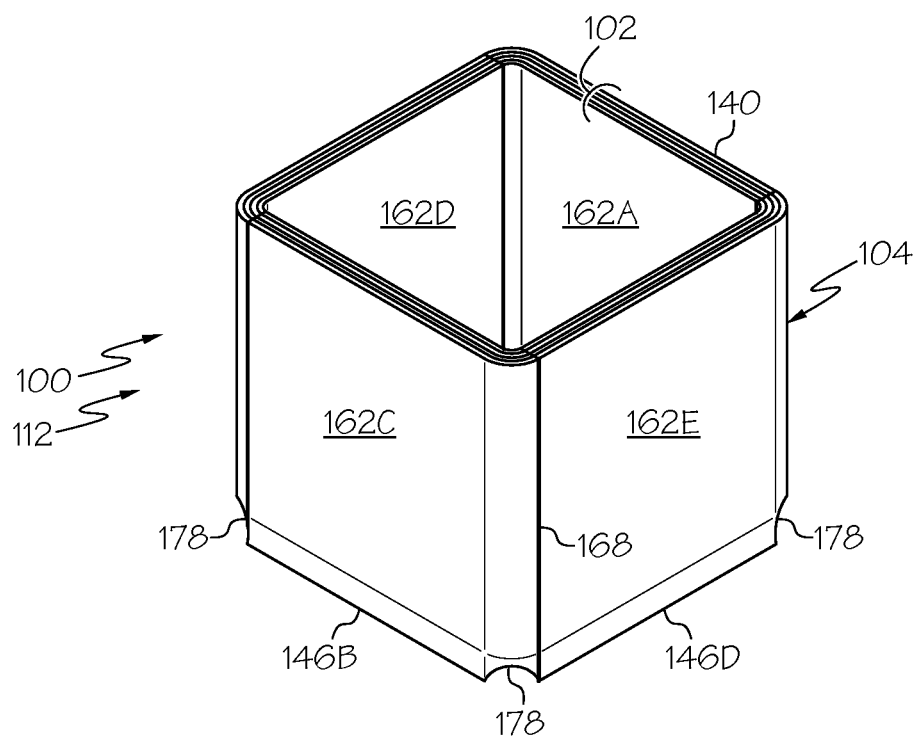
FIG. 12 is a schematic, perspective view of an example of the laminated metallic structure.
Figure 21:
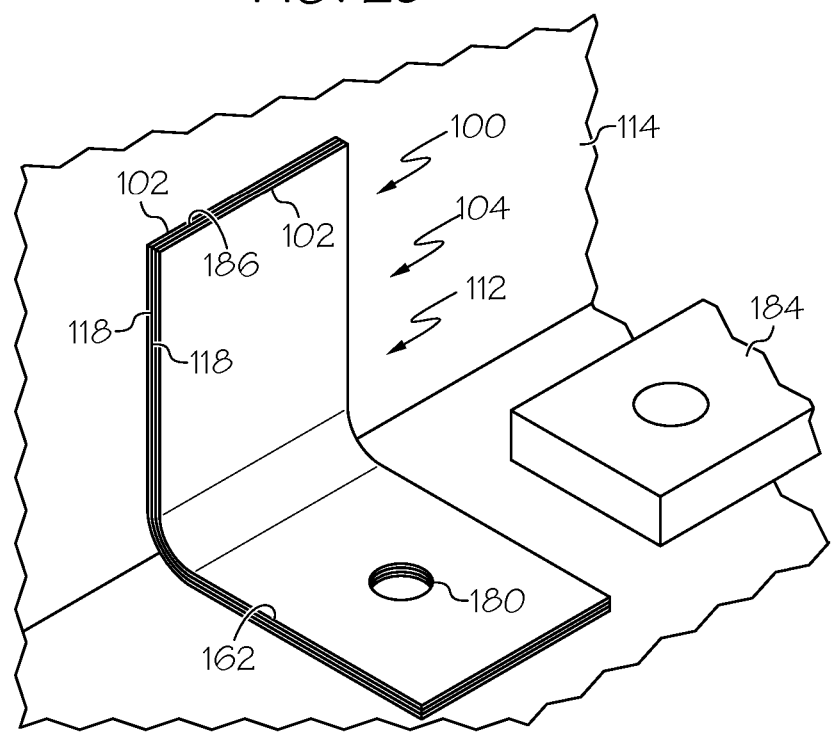
FIG. 21 is a schematic, perspective view of an example of the laminated metallic structure formed of the preformed metallic sheets and filler core of FIG. 20.
Figure 22:
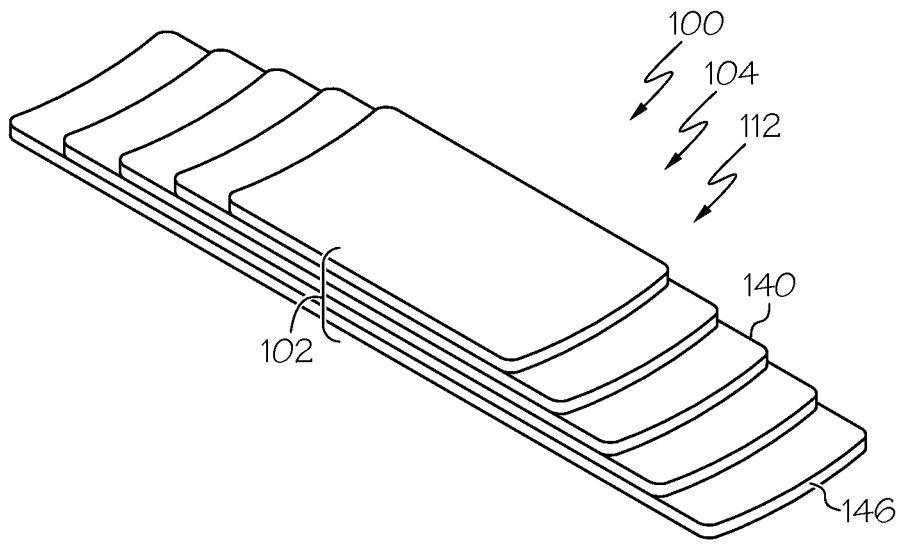
FIG. 22 is a schematic, perspective view of an example of the laminated metallic structure.
Figure 25:
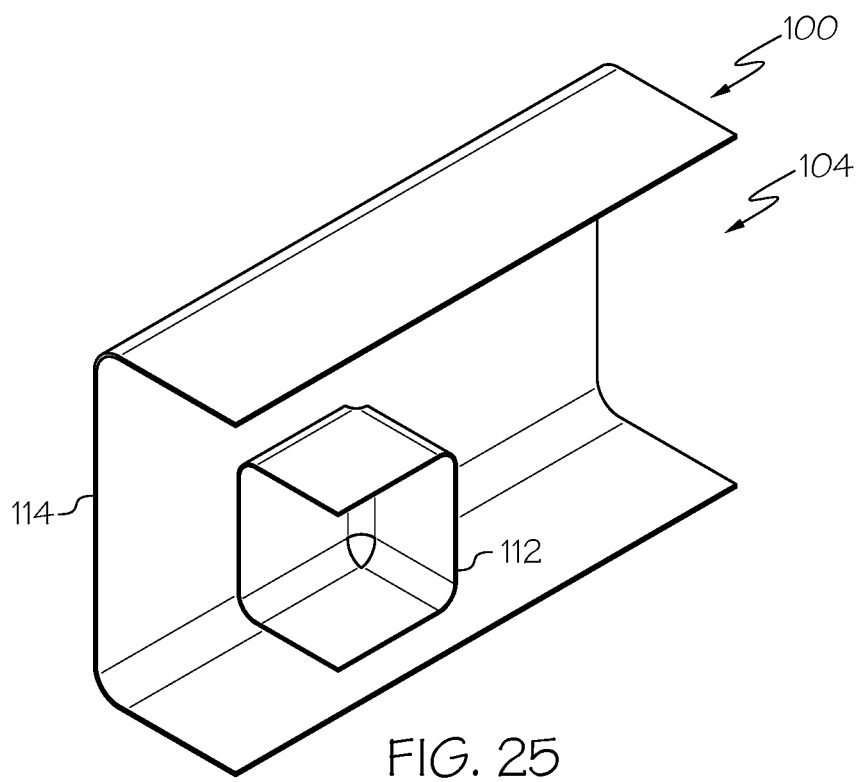
FIG. 25 is a schematic, perspective view of an example of a 3D body formed of the plurality of preforms of FIG. 24 nested together.

In an example, the attachment fitting 112 is configured to fix the secondary structure 184 relative to the primary structure 114. As an example, the attachment fitting 112 is a two-sided corner fitting, as illustrated in FIGS. 6A and 21. As another example, the attachment fitting 112 is a three-sided corner fitting, as illustrated in FIGS. 10 and 11. As another example, the attachment fitting 112 is a four-sided corner fitting, as illustrated in FIG. 25. As another example, the attachment fitting 112 is a five-sided corner fitting, as illustrated in FIG. 12. As another example, the attachment fitting 112 is a contoured strap fitting, as illustrated in FIG. 22.

Figure 17:
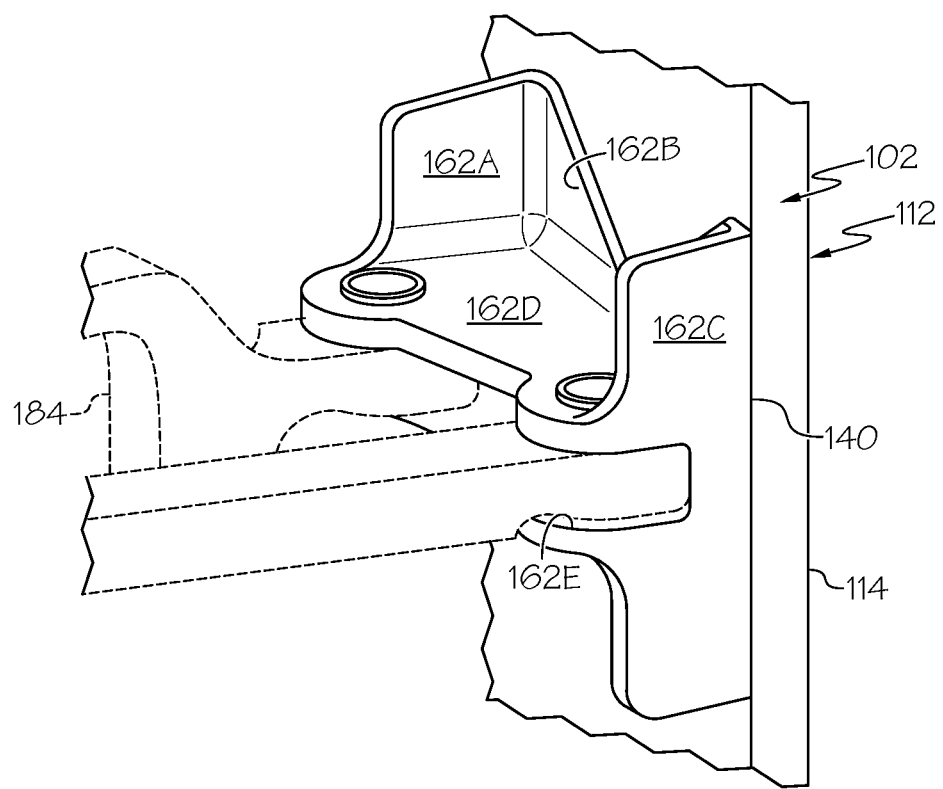
FIG. 17 is a schematic, perspective view of an example of an attachment fitting formed from the 3D body of FIG. 16.

In an example, the attachment fitting 112 is configured to enable movement of the secondary structure 184 relative to the primary structure 114. As an example, the attachment fitting 112 is a multi-sided, moveable joint coupling, as illustrated in FIG. 17. In an example, the attachment fitting 112 is coupled to (e.g., rigidly fixed relative to) the primary structure 114 and the secondary structure 184 is coupled to and is moveable relative to the attachment fitting 112. In the example illustrated in FIG. 17, the secondary structure 184 is a tie rod or actuator rod that is coupled to and is pivotable relative to the attachment fitting 112.

Figure 29:
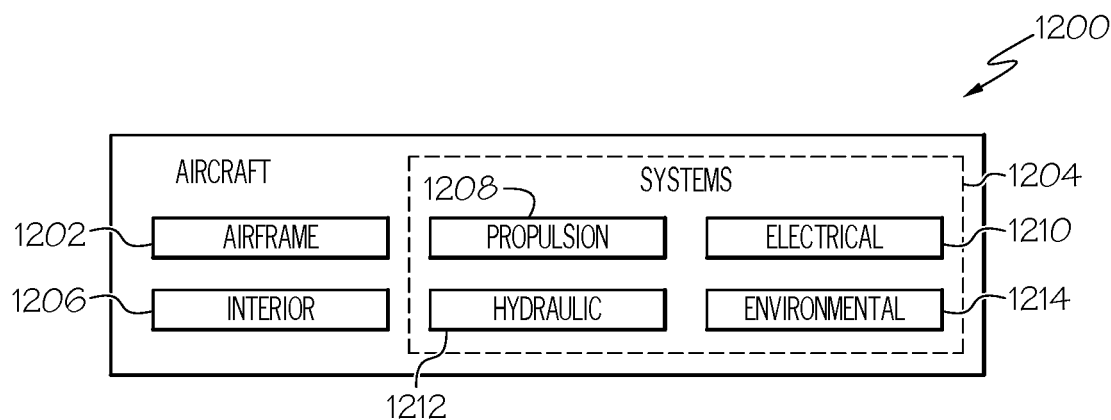
FIG. 29 is a block diagram of an aircraft.

In an example, the primary structure 114 is an aircraft 1200 (FIG. 29). In another example, the primary structure 114 is an underlying structural component forming the aircraft 1200, such as an airframe 1202 (FIG. 29).

Figure 23:
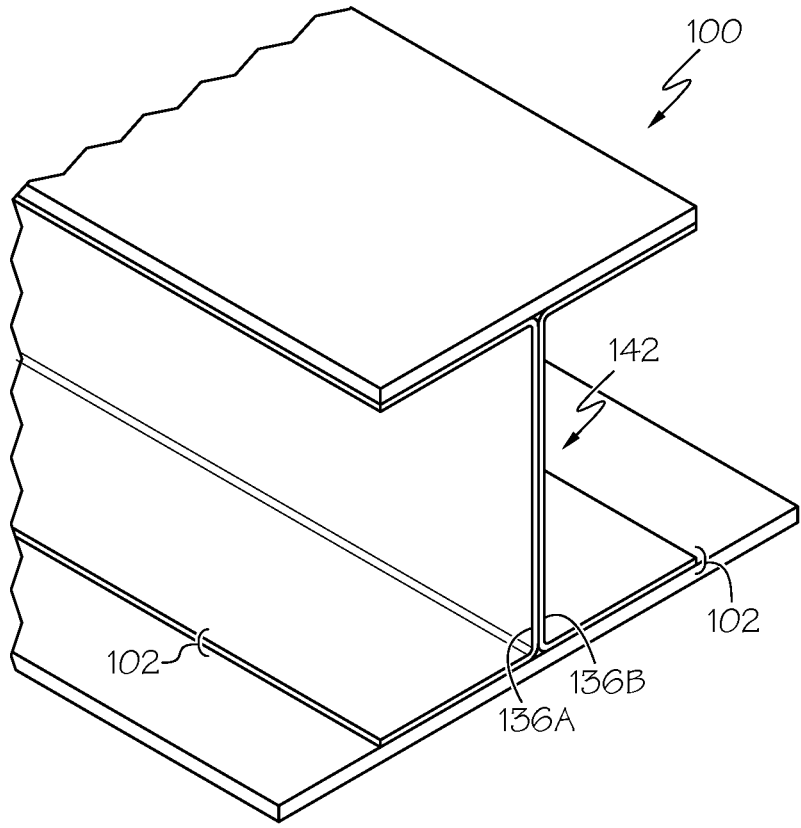
FIG. 23 is a schematic, perspective view of an example of the laminated metallic structure.

Referring to FIGS. 1 and 23, in another example, the laminated metallic structure 100 is a stiffener 142, such as a stringer of the aircraft 1200. As illustrated in FIG. 23, in an example, the stiffener 142 includes a first preform 136A that includes a first plurality of the preformed metallic sheets 102, which is nested together. Each one of the first plurality of the preformed metallic sheets 102 includes three side portions and two bends and the first preform 136A includes three sides and two bends. The stiffener 142 also includes a second preform 136B that includes a second plurality of the preformed metallic sheets 102, which is nested together. Each one of the second plurality of the preformed metallic sheets 102 includes three side portions and two bends and the second preform 136B includes three sides and two bends. The first preform 136A and the second preform 136B are positioned in a back-to-back relationship and are then bonded together to form the stiffener 142.

In another example, the laminated metallic structure 100 is a frame 144, such as a former of the aircraft 1200.

Referring generally to FIG. 1 and particularly to FIGS. 5A, 6A, 10-12, 16, 18, 21-23, and 25, in an example, each one of the plurality of preformed metallic sheets 102 is bonded to an adjacent one of the plurality of preformed metallic sheets 102 to form the three-dimensional body 104. As used herein, the term "adjacent" has its ordinary meaning as known to those skilled in the art and refers to an adjoining or directly neighboring item.

Referring generally to FIG. 1 and particularly to FIGS. 5A, 5B, 6A, 6B, and 14, in an example, the laminated metallic structure 100 includes an adhesive 118. As best illustrated in FIGS. 5B and 6B, the adhesive 118 is located between each adjacent pair of the plurality of preformed metallic sheets 102. The adhesive 118 is configured to adhesively bond each one of the plurality of preformed metallic sheets 102 to an adjacent one of the plurality of preformed metallic sheets 102. For example, the second preformed metallic sheet 102B is bonded to the first preformed metallic sheet 102A by the adhesive 118, the third preformed metallic sheet 102C is bonded to the second preformed metallic sheet 102B by the adhesive 118, etc. It should be appreciated that the thickness of each layer of the adhesive 118 shown in FIGS. 5B and 6B is exaggerated for the purpose of illustration.

In an example, the adhesive 118 includes, or takes the form of, at least one of an epoxy resin, a thermoset resin, and a thermoplastic resin. In another example, the adhesive 118 includes, or takes the form of, an adhesive film. In other examples, any other suitable adhesive material or bonding agent are also contemplated for use as the adhesive 118.

Referring to FIG. 1, in an example, each one of the plurality of preformed metallic sheets 102 includes a metallic material 116. In an example, each one of the plurality of preformed metallic sheets 102 takes the form of a thin sheet of the metallic material 116 that is formed or otherwise shaped into the three-dimensional shape 106 and that defines a layer of the laminated metallic structure 100.

In an example, the metallic material 116 of each one of the plurality of preformed metallic sheets 102 is the same. In another example, the metallic material 116 of at least one of the plurality of preformed metallic sheets 102 is different than the metallic material 116 of at least another one of plurality of preformed metallic sheets 102. For example, the first preformed metallic sheet 102A and the third preformed metallic sheet 102C are each formed of a first composition of the metallic material 116. The second preformed metallic sheets 102B is formed of a second composition of the metallic material 116. The first composition of the metallic material 116 and the second composition of the metallic material 116 are different.

In an example, the metallic material 116 includes titanium. In other examples, the metallic material 116 includes at least one of tin, stainless steel, steel alloys, magnesium alloys, brass, bronze, aluminum, copper, and alloys of the same. In other examples, the metallic material 116 includes any other suitable metal or metal alloy.

In one or more examples, the type of metallic material 116 making up one or more of the plurality of preformed metallic sheets 102 is selected based on a particular material property or characteristic that is imparted to the laminated metallic structure 100 (e.g., the attachment fitting 112). As an example, the metallic material 116 of one or more of the plurality of preformed metallic sheets 102 may be titanium for improved strength and durability. As an example, the metallic material 116 of one or more of the plurality of preformed metallic sheets 102 may be bronze for increased corrosion resistance. As an example, the metallic material 116 of one or more of the plurality of preformed metallic sheets 102 may be copper for improved electrical conductivity.

In an example, the metallic material 116 making up the plurality of preformed metallic sheets 102 is an electrically conductive material. The adhesive 118 located between and bonding each adjacent pair of the plurality of preformed metallic sheets 102 is an electrically conductive adhesive. In such an example, the laminated metallic structure 100 (e.g., the attachment fitting 112) may be used in locations where it is beneficial to enable current to pass, for example, between the primary structure 114 and the secondary structure 184, such as during a lightning strike or when components require grounding.

In an example, one or more of the plurality of preformed metallic sheets 102 includes at least two different types of metallic material 116. As an example, any one of the plurality of preformed metallic sheets 102 is made of a first type of the metallic material 116 (e.g., titanium for strength and durability). The preformed metallic sheet 102 has a section (e.g., a strip) of material removed (e.g., cut out). The removed section of the preformed metallic sheet 102 is replaced by a section of a second type of the metallic material 116 (e.g., copper or aluminum for conductive purposes), which is connected (e.g., welded) to the preformed metallic sheet 102 such that the preformed metallic sheet 102 includes both the first type of the metallic material 116 and the second type of the metallic material 116. This process can be performed on the blank-metallic sheet 128 prior to forming or on the preformed metallic sheet 102 after forming.

In an example, a thickness dimension of each one of the plurality of preformed metallic sheets 102 is the same. In another example, the thickness dimension of at least one of the plurality of preformed metallic sheets 102 is different than the thickness dimension of at least another one of plurality of preformed metallic sheets 102. As illustrated in FIGS. 5B and 6B, in an example, the first preformed metallic sheet 102A and the third preformed metallic sheet 102C form, or define, outer face sheets of the laminated metallic structure 100 and each has a first thickness. The second preformed metallic sheet 102B forms, or defines, an interlayer or filler layer of the laminated metallic structure 100 and has a second thickness that is different than the first thickness.

In another example, a configuration of at least one of the plurality of preformed metallic sheets 102 is different than the configuration of at least another one of plurality of preformed metallic sheets 102. For example, the first preformed metallic sheet 102A and the third preformed metallic sheet 102C (e.g., outer face sheets of the laminated metallic structure 100) are each formed of a solid sheet of the metallic material 116. The second preformed metallic sheet 102B (e.g., an interlayer or filler layer of the laminated metallic structure 100) is formed of a sheet of the metallic material 116 that includes a plurality of holes, recesses, cavities, or shallows for the purpose of decreasing the weight of the laminated metallic structure 100.

Referring generally to FIG. 1 and particularly to FIGS. 2A-3B and 7A-9B, in an example, each one of the plurality of preformed metallic sheets 102 is formed from a corresponding, or associated, one of a plurality of blank-metallic sheets 128 of graduated two-dimensional sizes 132 having a two-dimensional perimeter shape 120. Each one of the plurality of blank-metallic sheets 128 having a two-dimensional perimeter shape 120 is bent into a corresponding one of the plurality of preformed metallic sheets 102 having the three-dimensional shape 106.

Throughout the present disclosure, an individual blank-metallic sheet of the plurality of blank-metallic sheets 128 may be identified generally as one (e.g., each one, an adjacent one, a first one, a second one, etc.) of the plurality of blank-metallic sheets 128 or simply as the blank-metallic sheet 128. Additionally, throughout the present disclosure, an individual preformed metallic sheet of the plurality of blank-metallic sheets 128 may be identified specifically as a first blank-metallic sheet 128A, a second blank-metallic sheet 128B, etc.

Referring generally to FIG. 1 and particularly to FIGS. 2A-3B and 7A-9B, in an example, each one of the plurality of preformed metallic sheets 102 includes a plurality of side portions 160 and a bend 130 between each continuous pair of the plurality of side portions 160. Referring generally to FIG. 1 and particularly to FIGS. 6A, and 10-12, in an example, the resulting laminated metallic structure 100 (e.g., the attachment fitting 112) includes a plurality of sides 162 formed by the plurality of side portions 160 of the plurality of preformed metallic sheets 102 in a nested arrangement. The resulting laminated metallic structure 100 (e.g., the attachment fitting 112) also includes a bend 146 between each continuous pair of the plurality of sides 162 formed by bends 130 of the plurality of preformed metallic sheets 102 in the nested arrangement.

Figure 2A:
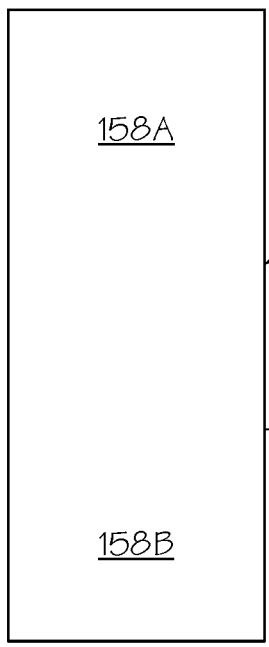
FIG. 2A is a schematic illustration of an example of a blank-metallic sheet of a first graduated 2D size.
Figure 2B:
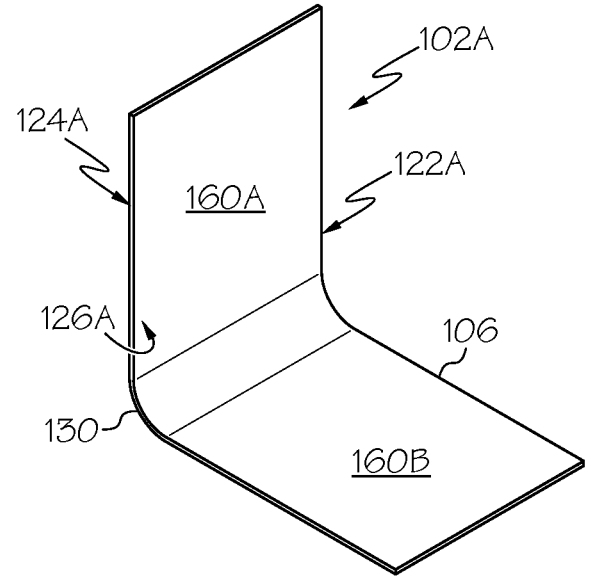
FIG. 2B is a schematic illustration of an example of a preformed metallic sheet of a first graduated 3D size formed from the blank-metallic sheet of FIG. 2A.
Figure 3A:
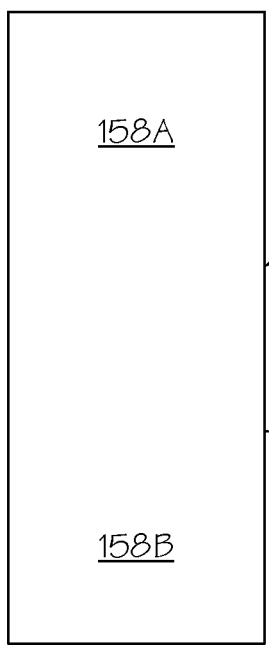
FIG. 3A is a schematic illustration of an example of a blank-metallic sheet of a second graduated 2D size.
Figure 3B:
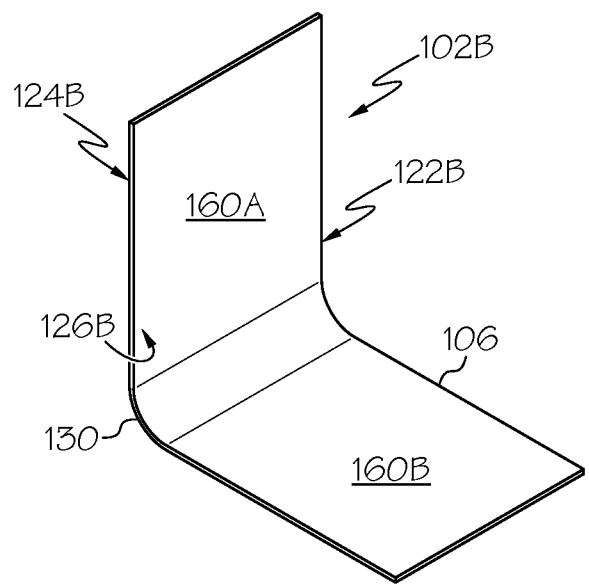
FIG. 3B is schematic illustration of an example of a preformed metallic sheet of a second graduated 3D size formed from the blank-metallic sheet of FIG. 3A.

Referring to FIGS. 2A-3B and 6A, in an example, the laminated metallic structure 100 (e.g., the attachment fitting 112) includes two sides 162 that are approximately perpendicular to each other. As illustrated in FIGS. 2B and 3B, each one of the plurality of preformed metallic sheets 102 includes two side portions 160 (first side portion 160A and second side portion 160B) and bend 130 between the first side portion 160A and the second side portion 160B defining the three-dimensional shape 106. As illustrated in FIG. 6A, the laminated metallic structure 100 (e.g., attachment fitting 112), formed of the plurality of preformed metallic sheets 102 depicted in FIGS. 2B and 3B, includes two sides 162 (first side 162A and second side 162B) and bend 146 between the first side 162A and the second side 162B defining the final three-dimensional shape 140.

Referring to FIGS. 7A-8B, 10, and 11, in one or more examples, the laminated metallic structure 100 (e.g., the attachment fitting 112) includes three sides 162 and each side 162 is approximately perpendicular to an adjacent side 162. As illustrated in FIGS. 7B and 8B, each one of the plurality of preformed metallic sheets 102 includes three side portions 160 (first side portion 160A, second side portion 160B, and third side portion 160C), a first bend 130A between the first side portion 160A and the second side portion 160B, and a second bend 130B between the second side portion 160B and the third side portion 160C defining the three-dimensional shape 106. As illustrated in FIGS. 10 and 11, the laminated metallic structure 100 (e.g., attachment fitting 112), formed of the plurality of preformed metallic sheets 102 depicted in FIGS. 7B and 8B, respectively, includes three sides 162 (first side 162A, second side 162B, and third side 162C), a first bend 146A between the first side 162A and the second side 162B, and a second bend 146B between second side 162B and the third side 162C defining the final three-dimensional shape 140. It should be appreciated that the differences between the three-dimensional shapes 106 of the preformed metallic sheets 102 shown in FIGS. 7B and 8B and, thus, the differences between the final three-dimensional shapes 140 of the laminated metallic structures 100 shown in FIGS. 10 and 11, depend on the predetermined two-dimensional perimeter shapes 120 of the corresponding blank-metallic sheets 128 shown in FIGS. 7A and 8A, respectively, and the predetermined forming operations.

Figure 9A:
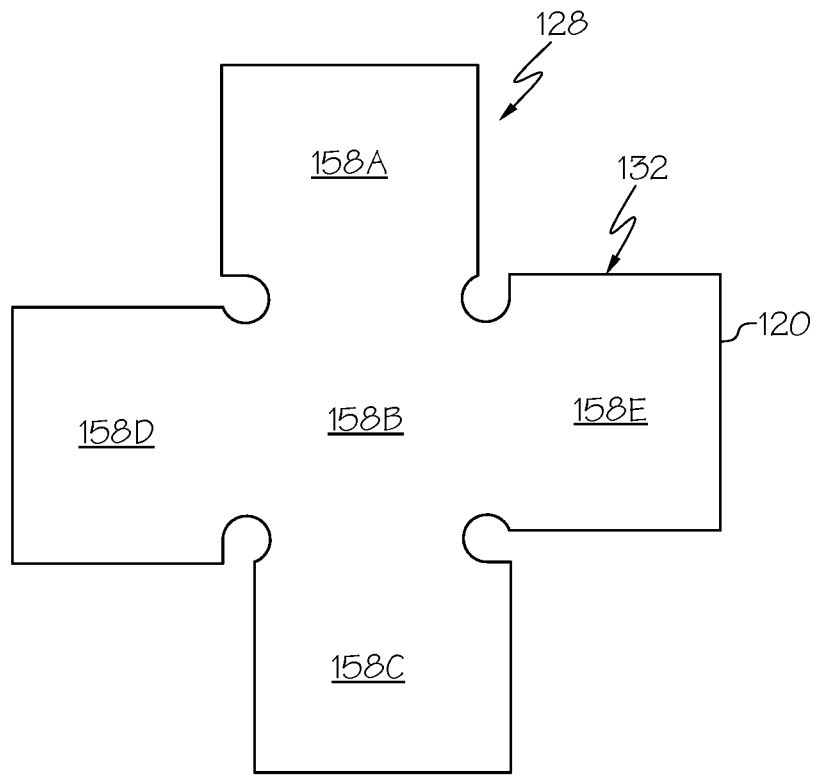
FIG. 9A is a schematic illustration of an example of a blank-metallic sheet.
Figure 9B:
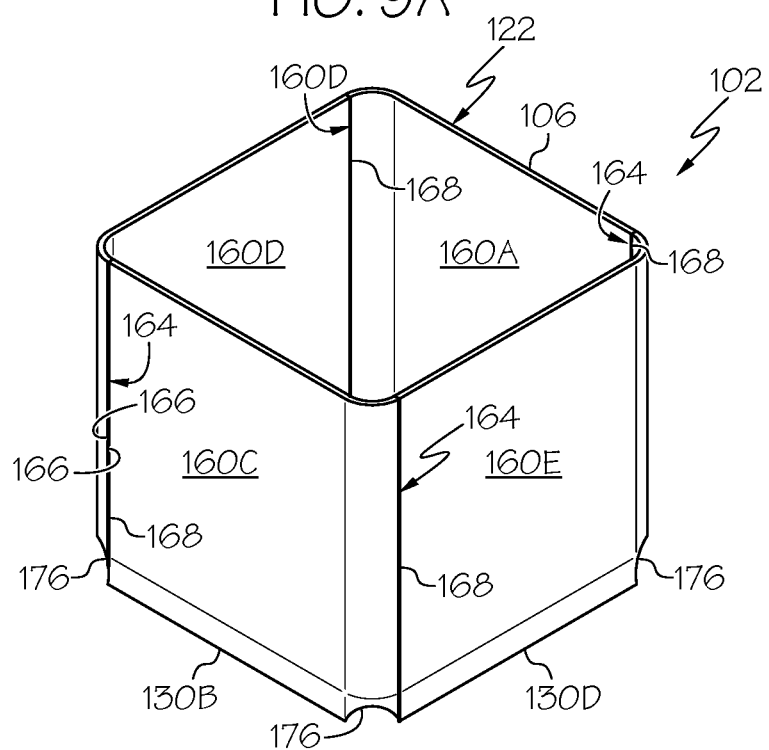
FIG. 9B is a schematic illustration of an example of a preformed metallic sheet formed from the blank-metallic sheet of FIG. 9A.

Referring to FIGS. 9A, 9B, and 12, in an example, the laminated metallic structure 100 (e.g., the attachment fitting 112) includes five sides 162 and each side 162 is approximately perpendicular to an adjacent side 162. As illustrated in FIG. 9B, each one of the plurality of preformed metallic sheets 102 includes five side portions 160 (first side portion 160A, second side portion (not visible in FIG. 9B), third side portion 160C, fourth side portion 160D, and fifth side portion 160E), a first bend (not visible in FIG. 9B) between the first side portion 160A and the second side portion, a second bend 130B between the second side portion and the third side portion 160C, a third bend (not visible in FIG. 9B) between the second side portion and the fourth side portion 160D, and a fourth bend 130D between the second side portion and the fifth side portion 160E defining the three-dimensional shape 106. As illustrated in FIG. 12, the laminated metallic structure 100 (e.g., attachment fitting 112), formed of the plurality of preformed metallic sheets 102 depicted in FIG. 9B, includes five sides 162 (first side 162A, second side (not visible in FIG. 12), third side 162C, fourth side 162D, and fifth side 162E), a first bend (not visible in FIG. 12) between the first side 162A and the second side, a second bend 146B between the second side and the third side 162C, a third bend (not visible in FIG. 12) between the second side and the fourth side 162D, and a fourth bend 146D between the second side and the fifth side 162E defining the final three-dimensional shape 140. It should be appreciated that while one example of the two-dimensional perimeter shape 120 of the blank-metallic sheets 128 used to form the preformed metallic sheets 102 is shown in FIGS. 9A and 9B, other examples of the two-dimensional perimeter shapes 120 of the blank-metallic sheets 128 are also contemplated that would utilize a different forming operation (e.g., bending configuration).

Figure 24:
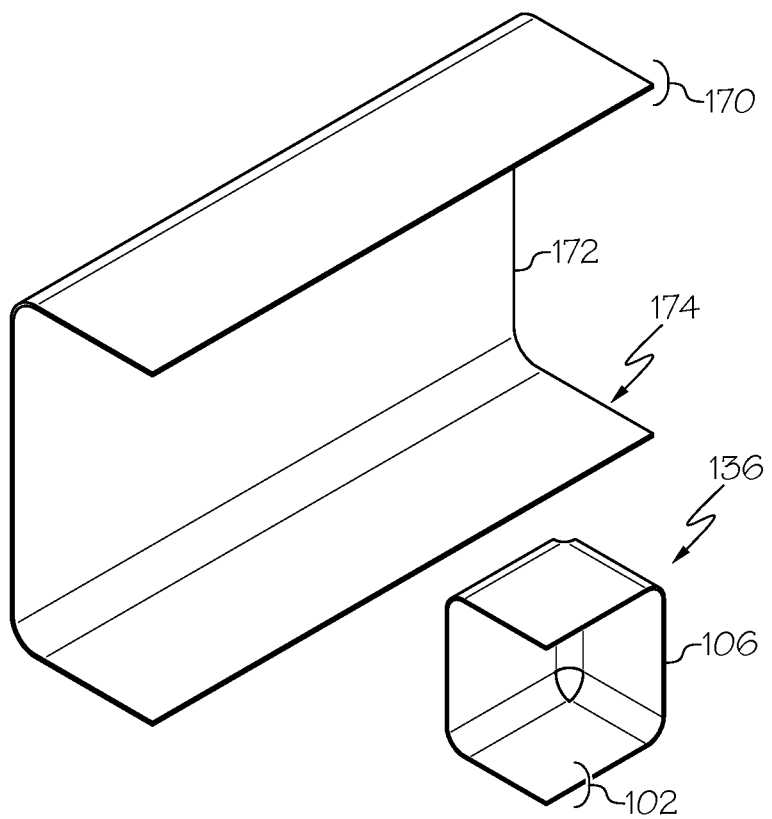
FIG. 24 is a schematic, perspective view of an example of a plurality of preforms.

In other examples, other three-dimensional shapes 106 of the preformed metallic sheets 102 and, thus, other final three-dimensional shapes 140 of the laminated metallic structure 100 (e.g., attachment fitting 112) are also contemplated. For example, as illustrated in FIGS. 24 and 25, in an example, the laminated metallic structure 100 (e.g., the attachment fitting 112) includes four sides 162 and each side 162 is approximately perpendicular to an adjacent side 162.

Referring to FIGS. 8A-9B, 13, and 14, in an example, each one of the plurality of preformed metallic sheets 102 includes a discontinuity 164 located between discontinuous pairs of the plurality of side portions 160. The discontinuity 164 is a physical break in continuity between adjacent edges 166 (e.g., perimeter sides) of discontinuous pairs of the plurality of side portions 160 of the preformed metallic sheet 102 once formed into the three-dimensional shape 106. As an example, illustrated in FIG. 8B, the discontinuity 164 is formed between adjacent edges 166 of the first side portion 160A and the third side portion 160C. As another example, illustrated in FIG. 9B, discontinuities 164 are formed between adjacent edges 166 of the first side portion 160A and the fourth side portion 160D, between adjacent edges 166 of the fourth side portion 160D and the third side portion 160C, between adjacent edges 166 of the third side portion 160C and the fifth side portion 160E, and between adjacent edges 166 of the fifth side portion 160E and the first side portion 160A.

Figure 13:
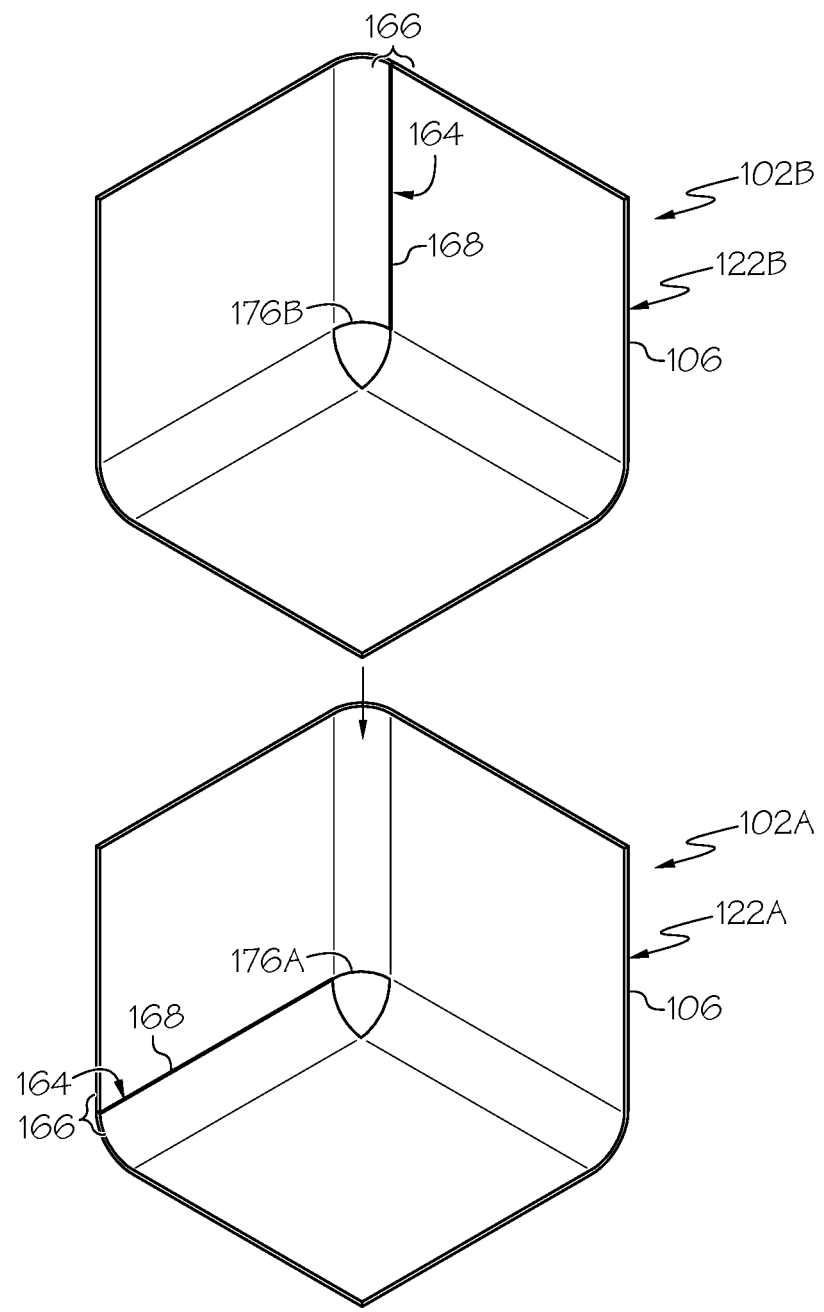
FIG. 13 is a schematic illustration of an example of two preformed metallic sheets being nested together.
Figure 14:
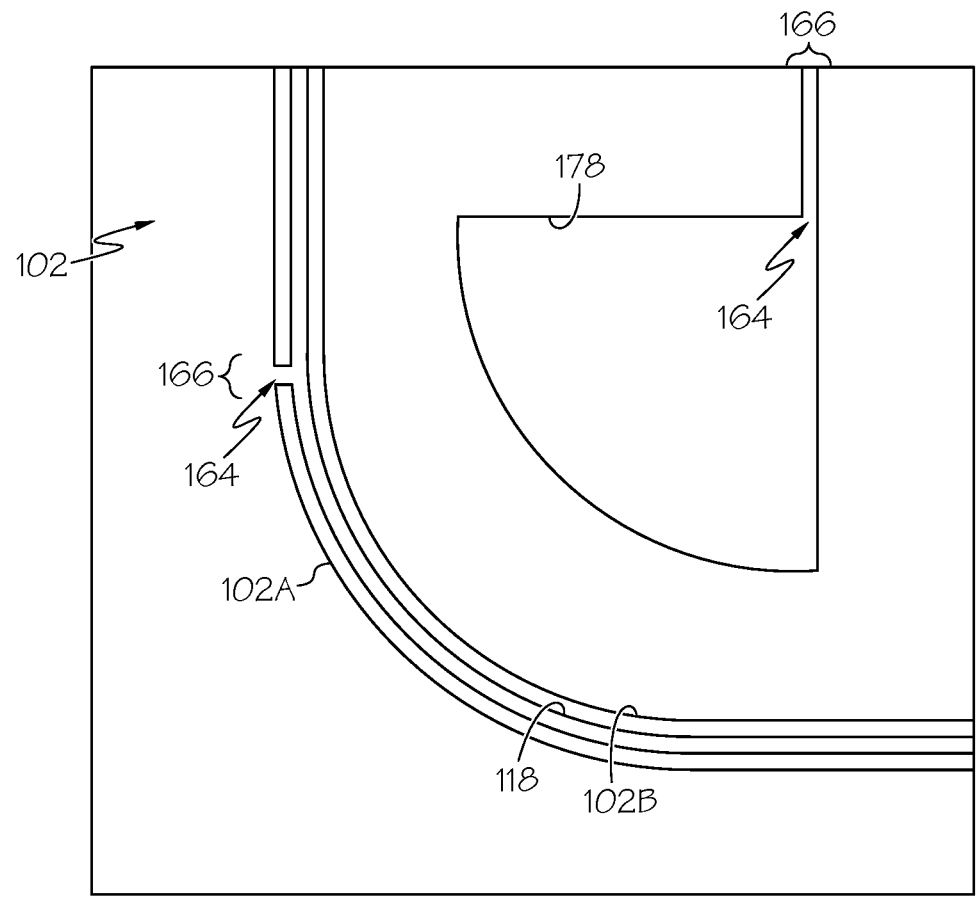
FIG. 14 is a schematic, elevation view of a portion of an example of the laminated metallic structure formed of the preformed metallic sheets of FIG. 13.

Referring to FIGS. 13 and 14, in an example, the discontinuity 164 of one of the plurality of preformed metallic sheets 102 is located at a non-zero angle relative to the discontinuity 164 of another one of the plurality of preformed metallic sheets 102. For example, when the second preformed metallic sheet 102B is nested in the first preformed metallic sheet 102A, the discontinuity 164 of the first preformed metallic sheet 102A is located at approximately ninety degrees relative to the discontinuity 164 of the second preformed metallic sheet 102B. In an example, the relative location of the discontinuity 164 of any given one of the plurality of preformed metallic sheets 102 is achieved by selecting a predetermined two-dimensional perimeter shape 120 of the corresponding one of the plurality of blank-metallic sheets 128 and a predetermined forming operation (e.g., bending order) that is different than the two-dimensional perimeter shape 120 and forming operation of another one of the plurality of blank-metallic sheets 128 corresponding to an adjacent one of the plurality of preformed metallic sheets 102. In another example, the relative location of the discontinuity 164 of any given one of the plurality of preformed metallic sheets 102 is achieved by rotating one of the plurality of preformed metallic sheets 102 relative to an adjacent one of the plurality of preformed metallic sheets 102.

In one or more other examples, the discontinuities 164 of two or more of the plurality of preformed metallic sheets 102 are aligned with each other.

Referring to FIGS. 8A-9B, 13, and 14, in an example, at least one of the plurality of preformed metallic sheets 102 includes a joint 168 between adjacent edges 166 of at least one discontinuous pair of the plurality of side portions 160. The joint 168 physically joins the break in continuity between adjacent edges 166 (e.g., perimeter sides) of discontinuous pairs of the plurality of side portions 160 of the preformed metallic sheet 102 once formed into the three-dimensional shape 106. In other words, the joint 168 fills or otherwise closes the discontinuity 164. As an example, illustrated in FIG. 8B, the joint 168 is formed between adjacent edges 166 of the first side portion 160A and the third side portion 160C, thereby replacing the discontinuity 164. As another example, illustrated in FIG. 9B, at least one joint 168 is formed between adjacent edges 166 of the first side portion 160A and fourth side portion 160D, between adjacent edges 166 of the fourth side portion 160D and the third side portion 160C, between adjacent edges 166 of the third side portion 160C and the fifth side portion 160E, and between adjacent edges 166 of the fifth side portion 160E and the first side portion 160A, thereby replacing at least one of the discontinuities 164.

In an example, the joint 168 of one of the plurality of preformed metallic sheets 102 is located at a non-zero angle relative to the joint 168 of another one of the plurality of preformed metallic sheets 102. In one or more other examples, the joints 168 of two or more of the plurality of preformed metallic sheets 102 are aligned with each other.

In one or more examples, one of the plurality of preformed metallic sheets 102 includes the joint 168 and an adjacent one of the plurality of preformed metallic sheets 102 includes the discontinuity 164. In an example, the joint 168 and the discontinuity 164 are aligned with each other. In another example, the joint 168 of one of the plurality of preformed metallic sheets 102 is located at a non-zero angle relative and the discontinuity 164 of an adjacent one of the plurality of preformed metallic sheets 102.

Referring to FIGS. 11, 12, and 14, in an example, the laminated metallic structure 100 (e.g., the attachment fitting 112) includes a corner-opening 178 at a corner defined by three adjacent ones of the plurality of sides 162. In an example, the corner-opening 176 is formed in the three-dimensional body 104 by a machining operation (e.g., drilling or milling) following the plurality of preformed metallic sheets 102 being nested and bonded together. In another example, as illustrated in FIGS. 8B, 9B, and 13, each one of the plurality of preformed metallic sheets 102 includes a corner-opening 176 at a corner defined by three adjacent ones of the plurality of side portions 160. Thus, the corner-opening 178 of the laminated metallic structure 100 is formed by corner-openings 176 (e.g., first corner-opening 176A, second corner-opening 176B, etc.) (FIG. 13) of the plurality of preformed metallic sheets 102 in the nested arrangement (FIG. 14). In an example, as illustrated in FIGS. 8A-9B, the corner-opening 176 of each one of the preformed metallic sheets 102 is defined by a portion of the two-dimensional perimeter shape 120 of a corresponding one of the blank-metallic sheets 128 and is formed during the forming (e.g., bending) operation.

Figure 15:
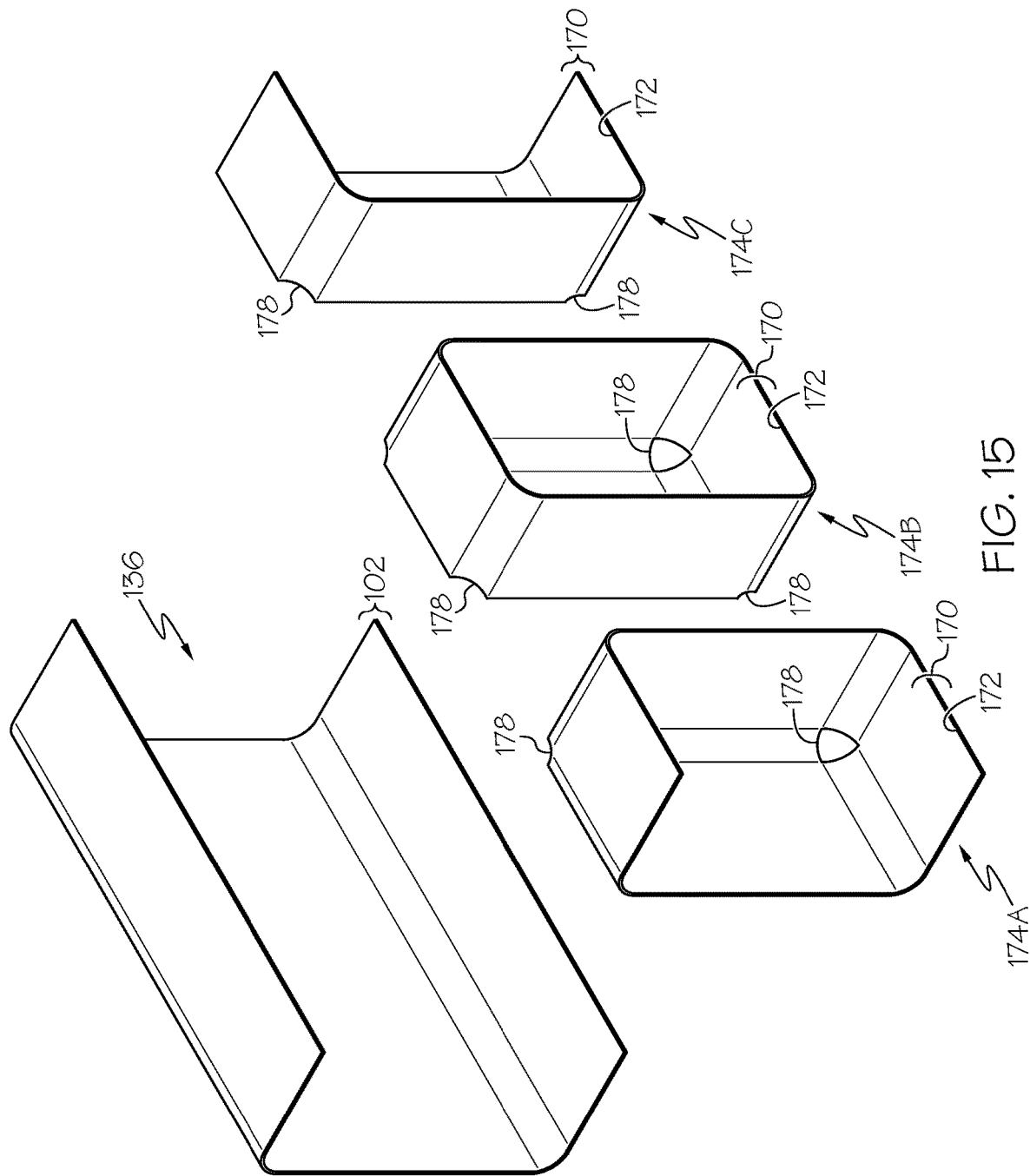
FIG. 15 is a schematic, perspective view of an example of a plurality of preforms.
Figure 16:
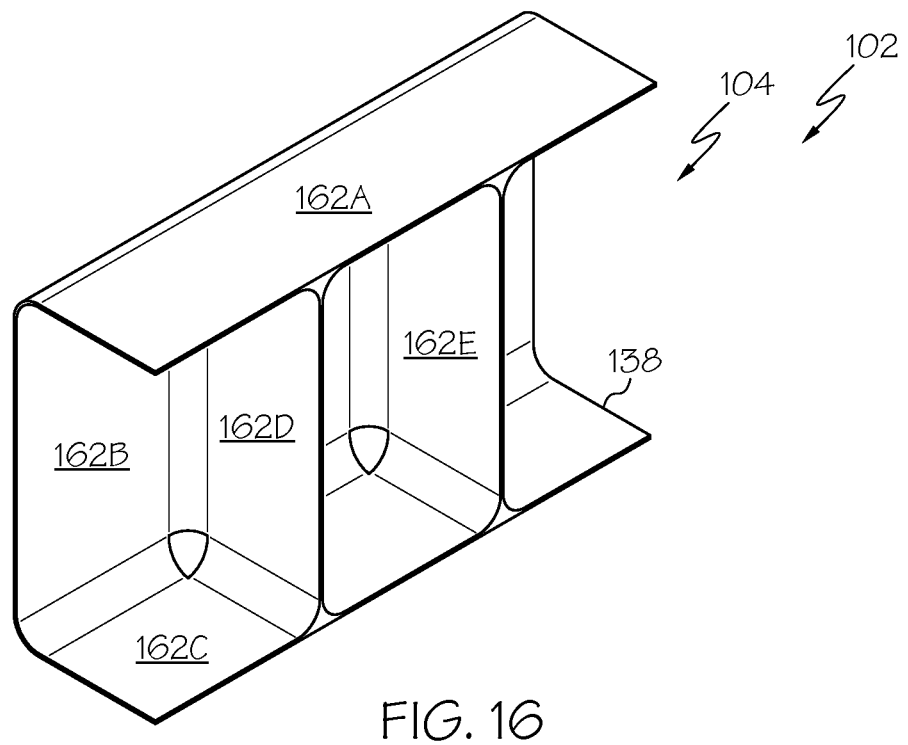
FIG. 16 is a schematic, perspective view of an example of a 3D body formed of the plurality of preforms of FIG. 15 nested together.

Referring to FIGS. 15-17, in an example, the laminated metallic structure 100 includes at least one second preform 174 (identified individually as second preform 174A, second preform 174B, second preform 174C in FIG. 15) nested in the preform 136. As illustrated in FIG. 15, the laminated metallic structure 100 includes a plurality of second preformed metallic sheets 170 of graduated three-dimensional sizes 122 having a second three-dimensional shape 172. The plurality of second preformed metallic sheets 170 is nested together to form the second preform 174. The second preform 174 is nested inside the preform 136. As illustrated in FIG. 16, the preform 136 and the second preform 174 are bonded together to form the three-dimensional body 104 having the near-net three-dimensional shape 138. As illustrated in FIG. 17, in an example, the laminated metallic structure 100 is machined into the attachment fitting 112 of the structure 114, the attachment fitting 112 having the final three-dimensional shape 140.

As illustrated in FIG. 16, in an example, the three-dimensional body 104 of the laminated metallic structure 100 includes a first side 162A; a second side 162B approximately perpendicular to the first side 162A; a third side 162C approximately perpendicular to the second side 162B and approximately parallel to the first side 162A; a fourth side 162D extending between the first side 162A and the third side 162C and approximately perpendicular to the first side 162A, the second side 162B, and the third side 162C; and a fifth side 162E extending between the first side 162A and the third side 162C and approximately perpendicular to the first side 162A, the second side 162B, and the third side 162C and approximately parallel to the fourth side 162D.

As illustrated in FIG. 17, in an example, the attachment fitting 112 resulting from the machined three-dimensional body 104 (FIG. 16) similarly includes the first side 162A, the second side 162B, the third side 162C, the fourth side 162D, and the fifth side 162E. In the example attachment fitting 112 illustrated in FIG. 17, the fourth side 162D and the fifth side 162E define parallel flanges between which the secondary structure 184 is moveably coupled.

Referring to FIGS. 15 and 16, in an example of the laminated metallic structure 100 and, thus, the attachment fitting 112 (FIG. 17), at least a portion of each side 162 is formed by the preform 136 and at least a portion of each side 162 is formed by the second preform 174. For example, at least portion of the first side 162A, the second side 162B, and the third side 162C is formed by the preform 136 that has three sides. At least a portion of the first side 162A, the second side 162B, the third side 162C, and the fourth side 162D is formed by second preform 174A. At least a portion of the first side 162A, the second side 162B, the third side 162C, the fourth side 162D, and the fifth side 162E is formed by second preform 174B. At least a portion of the first side 162A, the second side 162B, the third side 162C, and the fifth side 162E is formed by second preform 174C.

Figure 18:
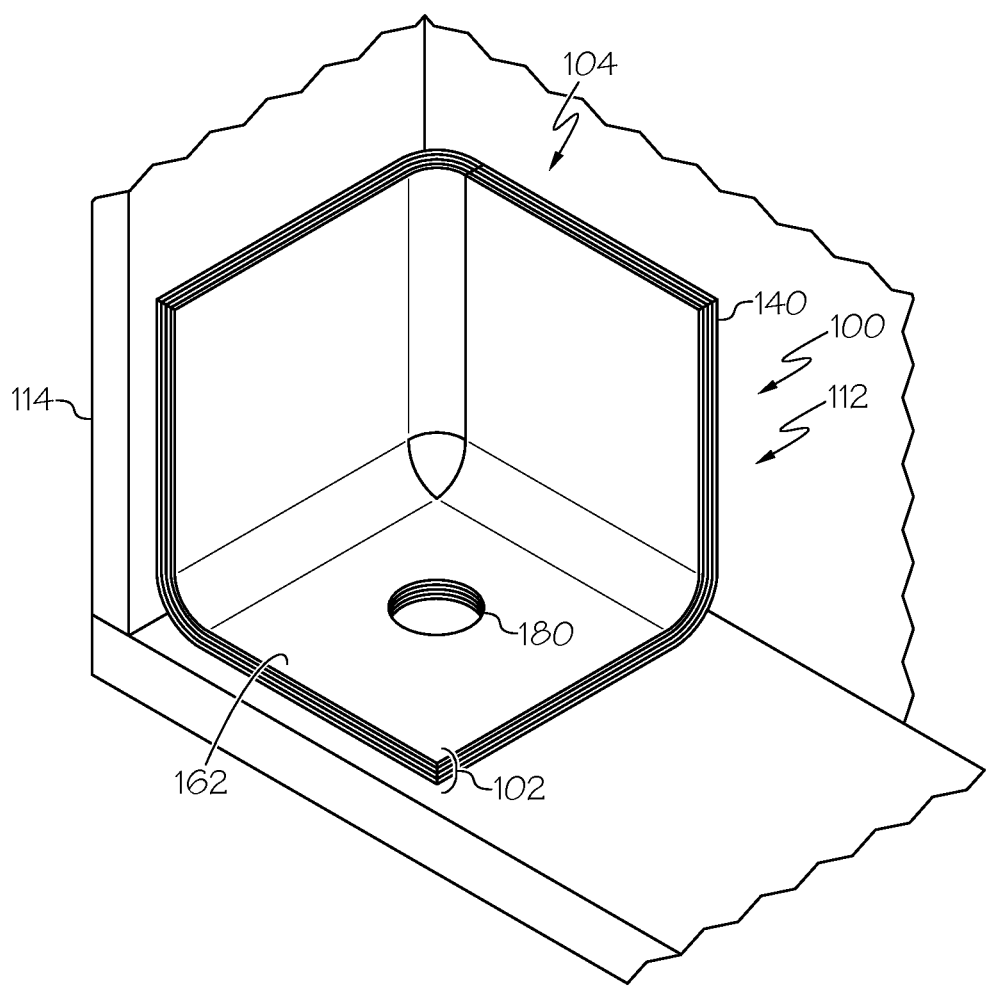
FIG. 18 is a schematic, perspective view of an example of the laminated metallic structure.
Figure 19:
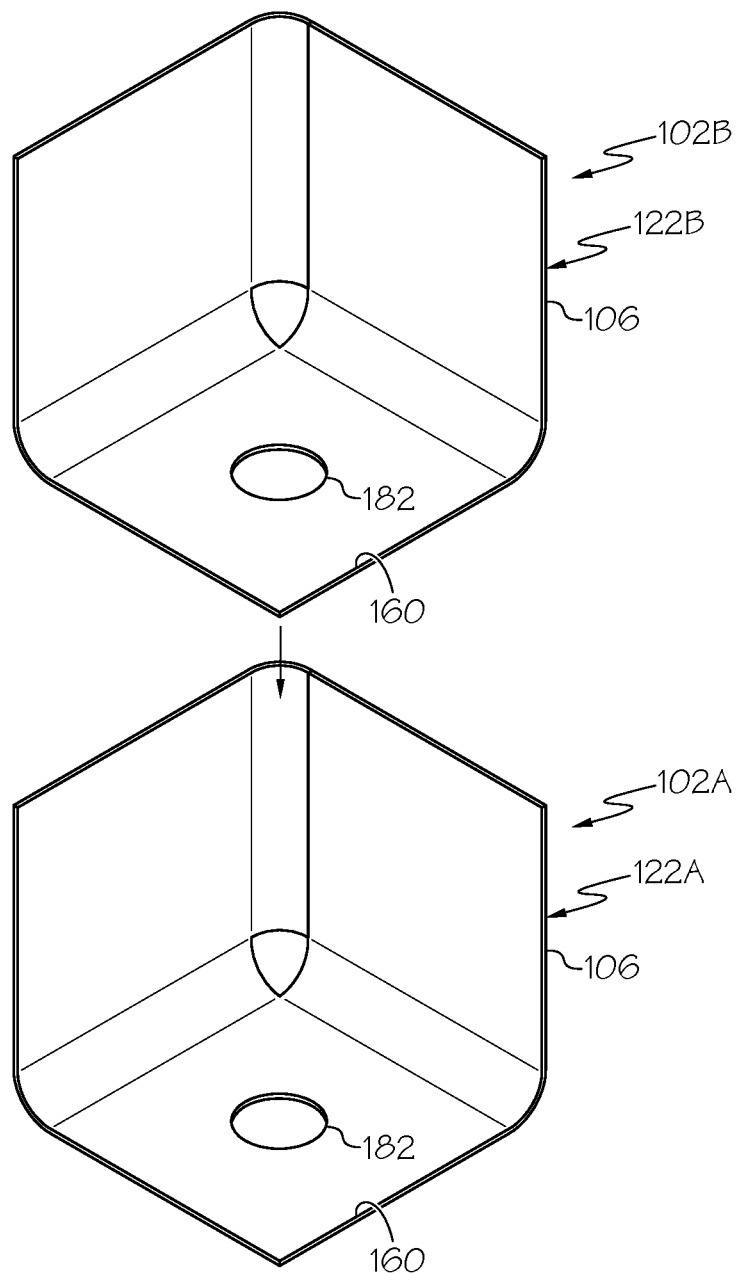
FIG. 19 is a schematic, perspective view of an example of two preformed metallic sheets used to form at least a portion of the laminated metallic structure of FIG. 18.

Referring to FIGS. 18 and 19, in an example, the laminated metallic structure 100 (e.g., the attachment fitting 112) includes at least one fastener-opening 180. The fastener-opening 180 is a through hole formed through at least one of the plurality of sides 162 of the laminated metallic structure 100 (e.g., the attachment fitting 112). In an example, the fastener-opening 180 is formed in the three-dimensional body 104 by a machining operation (e.g., drilling or milling) following the plurality of preformed metallic sheets 102 being nested and bonded together. In another example, as illustrated in FIG. 19, each one of the plurality of preformed metallic sheets 102 (e.g., the first preformed metallic sheet 102A, the second preformed metallic sheet 102B, etc.) includes a fastener-opening 182 formed through at least one of the plurality of side portions 160. Thus, the fastener-opening 180 of the laminated metallic structure 100 is formed by fastener-openings 182 of the plurality of preformed metallic sheets 102 in the nested arrangement (FIG. 18). Generally, the fastener-opening 180 of the laminated metallic structure 100 (e.g., the attachment fitting 112) is configured to receive a fastener (not shown) that enables the laminated metallic structure 100 (e.g., the attachment fitting 112) to be coupled to the primary structure 114 or the secondary structure 184.

Figure 20:
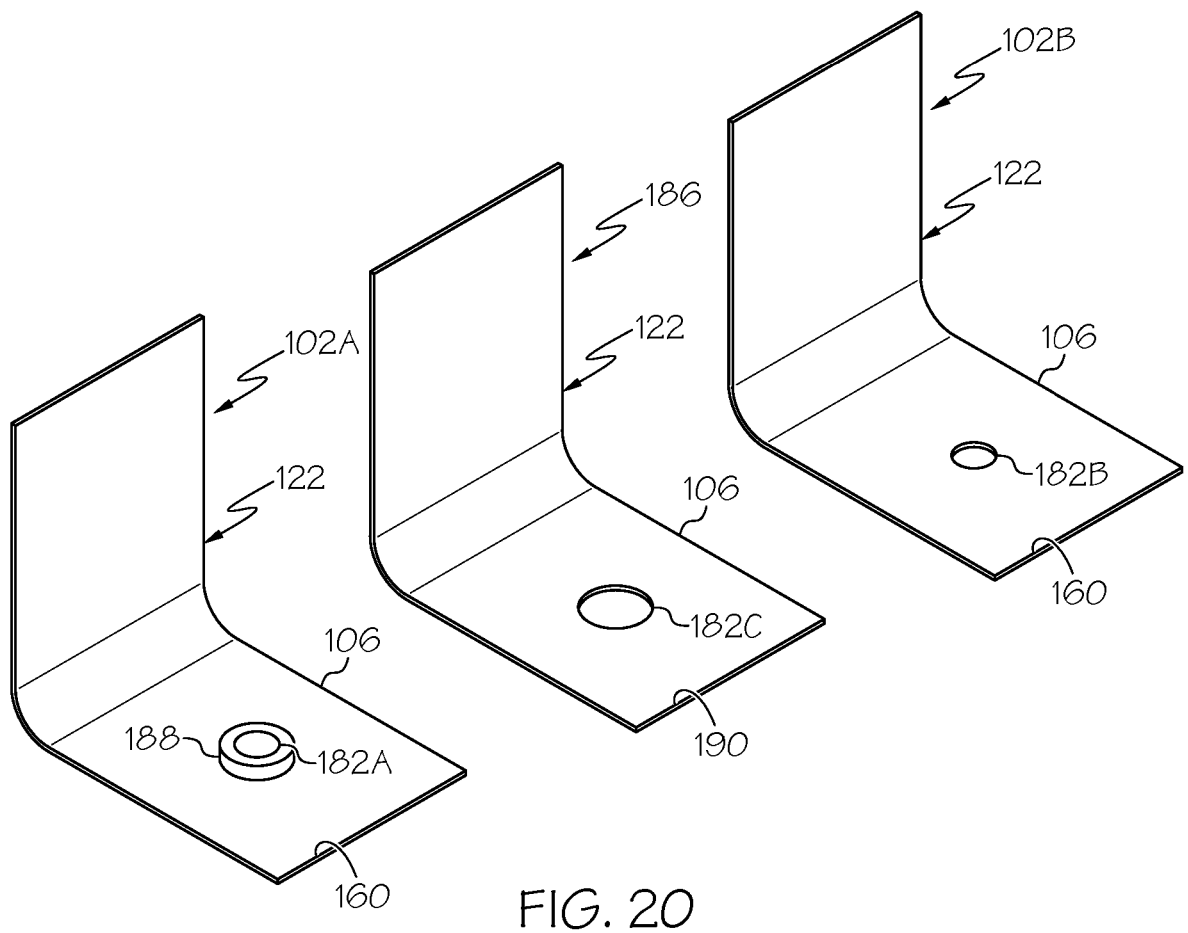
FIG. 20 is a schematic, perspective view of an example of two preformed metallic sheets and a filler core.

Referring to FIGS. 20 and 21, in an example, the laminated metallic structure 100 (e.g., the attachment fitting 112) (FIG. 21) includes a core layer 186. The plurality of preformed metallic sheets 102 and the core layer 186 are nested together to form the preform 136. In other words, the core layer 186 is positioned between a pair of preformed metallic sheets 102 (e.g., first preformed metallic sheet 102A and second preformed metallic sheet 102B). The plurality of preformed metallic sheets 102 and the core layer 186 are bonded together to form the three-dimensional body 104 having the near-net three-dimensional shape 138. The core layer 186 has the same three-dimensional shape 106 as the plurality of preformed metallic sheets 102 and a graduated three-dimensional size 122 between the pair of preformed metallic sheets 102. The core layer 186 forms a filler layer between the pair of preformed metallic sheets 102. The core layer 186 is formed of a material that is different than the metallic material 116 of the plurality of preformed metallic sheets 102. As examples, the core layer 186 includes, or takes the form of, a foam material, a honeycomb material, or other suitable lightweight material.

Referring to FIGS. 20 and 21, in an example, the laminated metallic structure 100 (e.g., the attachment fitting 112) (FIG. 21) includes the fastener-opening 180 formed in at least one of the plurality of sides 162 that is structurally reinforced to prevent damage to the core layer 186 when installing the fastener (not shown). In an example, as illustrated in FIG. 20, the first preformed metallic sheet 102A includes a protrusion 188 formed in at least one of the side portions 160. A first fastener-opening 182A of the first preformed metallic sheet 102A is formed through the protrusion 188. The core layer 186 includes an associated third fastener-opening 182C formed in at least one of the side portions 190 of the core layer 186. The third fastener-opening 182C of the core layer 186 has a diameter approximately equal to a diameter of the protrusion 188 so that the protrusion 188 of the first preformed metallic sheet 102A fits within the third fastener-opening 182C of the core layer 186 when the core layer 186 is nested in the first preformed metallic sheet 102A. The second preformed metallic sheet 102B includes a second fastener-opening 182B formed through at least one of the plurality of side portions 160. The second fastener-opening 182B of the second preformed metallic sheet 102B has a diameter approximately equal to a diameter of the first fastener-opening 182A so that the first fastener-opening 182A and the second fastener-opening 182B are coaxially aligned when the second preformed metallic sheet 102B is nested in the core layer 186. The protrusion 188 provides a structurally reinforced area within the core layer 186 to react to fastening loads applied during installation of the fastener.

Referring to FIGS. 24 and 25, in an example, the laminated metallic structure 100 includes the primary structure 114 and the attachment fitting 112. The primary structure 114 and the attachment fitting 112 are integrated into a unitary body. In an example, the attachment fitting 112 includes the plurality of preformed metallic sheets 102 having the three-dimensional shape 106. The plurality of preformed metallic sheets 102 is nested together to form the preform 136. The primary structure 114 includes the plurality of second preformed metallic sheets 170 having the second three-dimensional shape 172. The plurality of second preformed metallic sheets 170 is nested together to form the second preform 174. The preform 136 is nested inside the second preform 174. As illustrated in FIG. 25, the preform 136 and the second preform 174 are bonded (e.g., adhesively bonded) together to form the three-dimensional body 104 having the near-net three-dimensional shape 138. In an example, the three-dimensional body 104 may be machined, as needed, into the laminated metallic structure 100 having the final three-dimensional shape 140.

Figure 26:
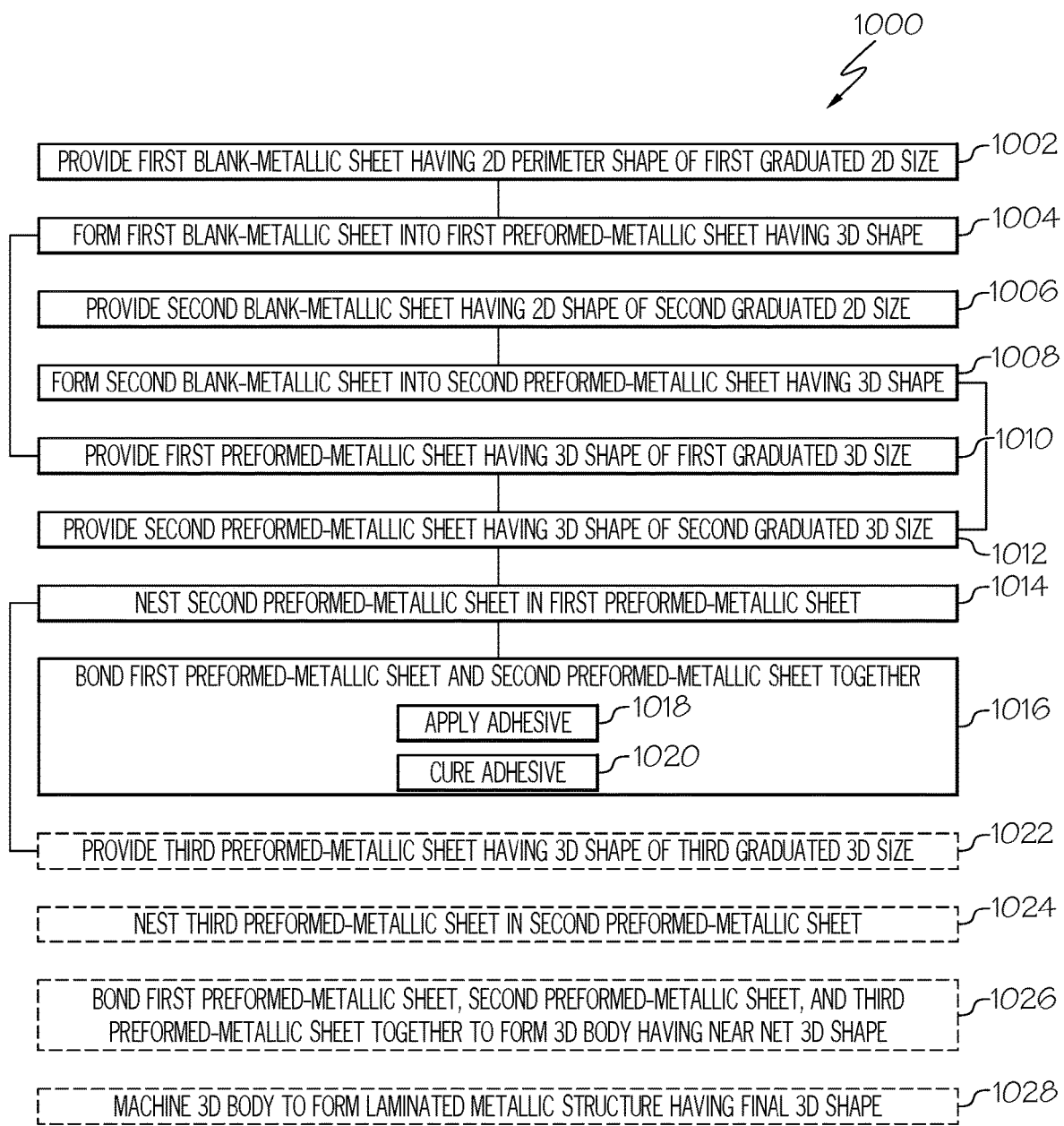
FIG. 26 is a flow diagram of an example of a method of forming a laminated metallic structure.

Referring generally to FIGS. 1-25 and particularly to FIG. 26, examples of a method 1000 of forming the laminated metallic structure 100 are disclosed. The laminated metallic structure 100 made according to the method 1000 includes the plurality of preformed metallic sheets 102 of graduated three-dimensional sizes 122 having the three-dimensional shape 106 nested together to form the preform 136. The preform 136 is bonded together to form the three-dimensional body 104 having the near-net three-dimensional shape 138.

Referring generally to FIGS. 1 and 26, in an example, according to the method 1000, each one of the plurality of preformed metallic sheets 102 is formed (e.g., bent or otherwise shaped) into its respective three-dimensional shape 106 from a corresponding one of the plurality of blank-metallic sheets 128. As illustrated in FIGS. 2,3, and 7-9, each one of the plurality of blank-metallic sheets 128 has the two-dimensional perimeter shape 120 of the graduated two-dimensional size 132.

Referring generally to FIGS. 2 and 3 and particularly to FIG. 26, in an example, the method 1000 includes a step of (block 1002) providing the first blank-metallic sheet 128A having the two-dimensional perimeter shape 120 of the first graduated two-dimensional size 132A. The method 1000 also includes a step of (block 1004) forming the first blank-metallic sheet 128A into the first preformed metallic sheet 102A having the three-dimensional shape 106. The method 1000 further includes a step of (block 1006) providing the second blank-metallic sheet 128B having the two-dimensional perimeter shape 120 of a second graduated two-dimensional size 132B. The method 1000 additionally includes a step of (block 1008) forming the second blank-metallic sheet 128B into the second preformed metallic sheet 102B having the three-dimensional shape 106.

As used herein, the term "providing" refers to readying or supplying an item for use and does not necessarily require fabrication of the item.

Referring generally to FIG. 1 and particularly to FIG. 26, in an example, the method 1000 includes a step of forming the first blank-metallic sheet 128A having the two-dimensional perimeter shape 120 by at least one of stamping and cutting at least one flat sheet 134 of a metallic material 116. The method 1000 also includes a step of forming the second blank-metallic sheet 128B having the two-dimensional perimeter shape 120 by at least one of stamping and cutting the at least one flat sheet 134 of the metallic material 116.

Referring to FIG. 1, in an example, a manufacturing environment 156 includes at least one two-dimensional-shaping apparatus 148 that is configured to form the first blank-metallic sheet 128A and the second blank-metallic sheet 128B into the corresponding two-dimensional perimeter shape 120. As examples, the two-dimensional-shaping apparatus 148 includes at least one of a sheet metal stamping machine or a sheet metal cutting machine.

Referring generally to FIG. 1 and particularly to FIG. 26, in an example, according to the method 1000, the step of (block 1004) forming the first blank-metallic sheet 128A into the first preformed metallic sheet 102A having the three-dimensional shape 106 includes a step of forming at least one bend 130 (FIG. 2) in the first blank-metallic sheet 128A in at least one dimension by at least one of bending, roll forming, draw forming, and stretch forming. Similarly, the step of (block 1008) forming the second blank-metallic sheet 128B into the second preformed metallic sheet 102B having the three-dimensional shape 106 includes a step of forming at least one bend 130 (FIG. 3) in the second blank-metallic sheet 128B in at least one dimension by at least one of bending, roll forming, draw forming, and stretch forming.

Referring to FIG. 1, in an example, the manufacturing environment 156 includes at least one three-dimensional-shaping apparatus 150 that is configured to form the first blank-metallic sheet 128A into the three-dimensional shape 106 corresponding to the first preformed metallic sheet 102A and to form the second blank-metallic sheet 128B into the three-dimensional shape 106 corresponding to the second preformed metallic sheet 102B. As examples, the three-dimensional-shaping apparatus 150 includes at least one of a sheet metal bending machine, a sheet metal roll-forming machine, a sheet metal draw-forming machine, and a sheet metal stretch-forming machine. In an example, the three-dimensional-shaping apparatus 150 includes a discrete tool corresponding to each three-dimensional shape 106 and graduated three-dimensional size 122 used to individually form each one of the plurality of preformed metallic sheets 102. In another example, the three-dimensional-shaping apparatus 150 includes a single tool used to form all of the plurality of preformed metallic sheets 102.

Referring generally to FIGS. 2A-5B and particularly to FIG. 26, in an example, the method 1000 includes a step of (block 1010) providing the first preformed metallic sheet 102A having the three-dimensional shape 106 of the first graduated three-dimensional size 122A. The method 1000 also includes a step of (block 1012) providing the second preformed metallic sheet 102B having the three-dimensional shape 106 of the second graduated three-dimensional size 122B. The method 1000 further includes a step of (block 1014) nesting the second preformed metallic sheet 102B in the first preformed metallic sheet 102A. The method 1000 additionally includes a step of (block 1016) bonding the first preformed metallic sheet 102A and the second preformed metallic sheet 102B together.

Referring generally to FIGS. 2A-4 and particularly to FIG. 26, in an example, according to the method 1000, the step of (block 1016) bonding the first preformed metallic sheet 102A and the second preformed metallic sheet 102B together includes a step of (block 1018) applying the adhesive 118 (FIG. 4) to at least one of the first preformed metallic sheet 102A and the second preformed metallic sheet 102B and a step of (block 1020) curing the adhesive 118 using at least one of heat and pressure.

In an example, according to the method 1000, the step of (block 1018) of applying the adhesive 118 is performed manually or automatically and includes applying the adhesive 118 to at least one of the first inner periphery face 126A (FIG. 2B) of the first preformed metallic sheet 102A and the second outer periphery face 124B (FIG. 3B) of the second preformed metallic sheet 102B before the step of (block 1014) nesting the second preformed metallic sheet 102B in the first preformed metallic sheet 102A. In another example, according to the method 1000, the step of (block 1018) of applying the adhesive 118 includes placing (e.g., laying up) a layer of the adhesive film between the first preformed metallic sheet 102A and the second preformed metallic sheet 102B before the step of (block 1014) nesting the second preformed metallic sheet 102B in the first preformed metallic sheet 102A.

Referring to FIG. 1, in an example, the manufacturing environment 156 includes at least one bonding apparatus 152 that is configured to apply at least one of heat and pressure to the preform 136 (e.g., formed by the first preformed metallic sheet 102A and the second preformed metallic sheet 102B in the nested arrangement). As examples, the bonding apparatus 152 includes at least one of an oven and an autoclave.

Referring to FIGS. 1 and 5A, according to the method 1000, in one or more examples, any number of additional preformed metallic sheets 102 of graduated three-dimensional sizes 122 having the three-dimensional shape 106 are formed from additional blank-metallic sheets 128 and are nested together and bonded to form the preform 136.

Referring generally to FIGS. 1, 5A, and 5B, in an example, the method 1000 includes a step of (block 1022) providing the third preformed metallic sheet 102C having the three-dimensional shape 106 of the third graduated three-dimensional size. The method 1000 also includes a step of (block 1024) nesting the third preformed metallic sheet 102C in the second preformed metallic sheet 102B to form the preform 136. The method 1000 further includes a step of (block 1026) bonding the first preformed metallic sheet 102A, the second preformed metallic sheet 102B, and the third preformed metallic sheet 102C together to form the three-dimensional body 104 having the near-net three-dimensional shape 138.

Referring generally to FIGS. 1, 6A, and 6B and particularly to FIG. 26, in an example, the method 1000 includes a step of (block 1028) machining the three-dimensional body 104 to form the laminated metallic structure 100 having the final three-dimensional shape 140.

Referring to FIG. 1, in an example, the manufacturing environment 156 includes at least one machining apparatus 154 that is configured to perform one or more finishing operations on the three-dimensional body 104 to achieve the final three-dimensional shape 140. As examples, the machining apparatus 154 includes at least one of a drilling machine, a milling machine, and a grinding machine.

Referring generally to FIG. 1 and particularly to FIGS. 6A, 10-12, 17, 18, 21-23, and 25, in an example, according to the method 1000, the laminated metallic structure 100 is one of the attachment fitting 112, the stiffener 142, or the frame 144 of the structure 114.

Referring generally to FIG. 1 and particularly to FIGS. 6A, 10-12, 17, 18, 21-23, and 25, in an example, according to the method 1000, the laminated metallic structure 100 includes at least one bend 146 in at least one dimension. In another example, according to the method 1000, the laminated metallic structure 100 includes a plurality of bends 146 in at least one dimension.

Figure 27:
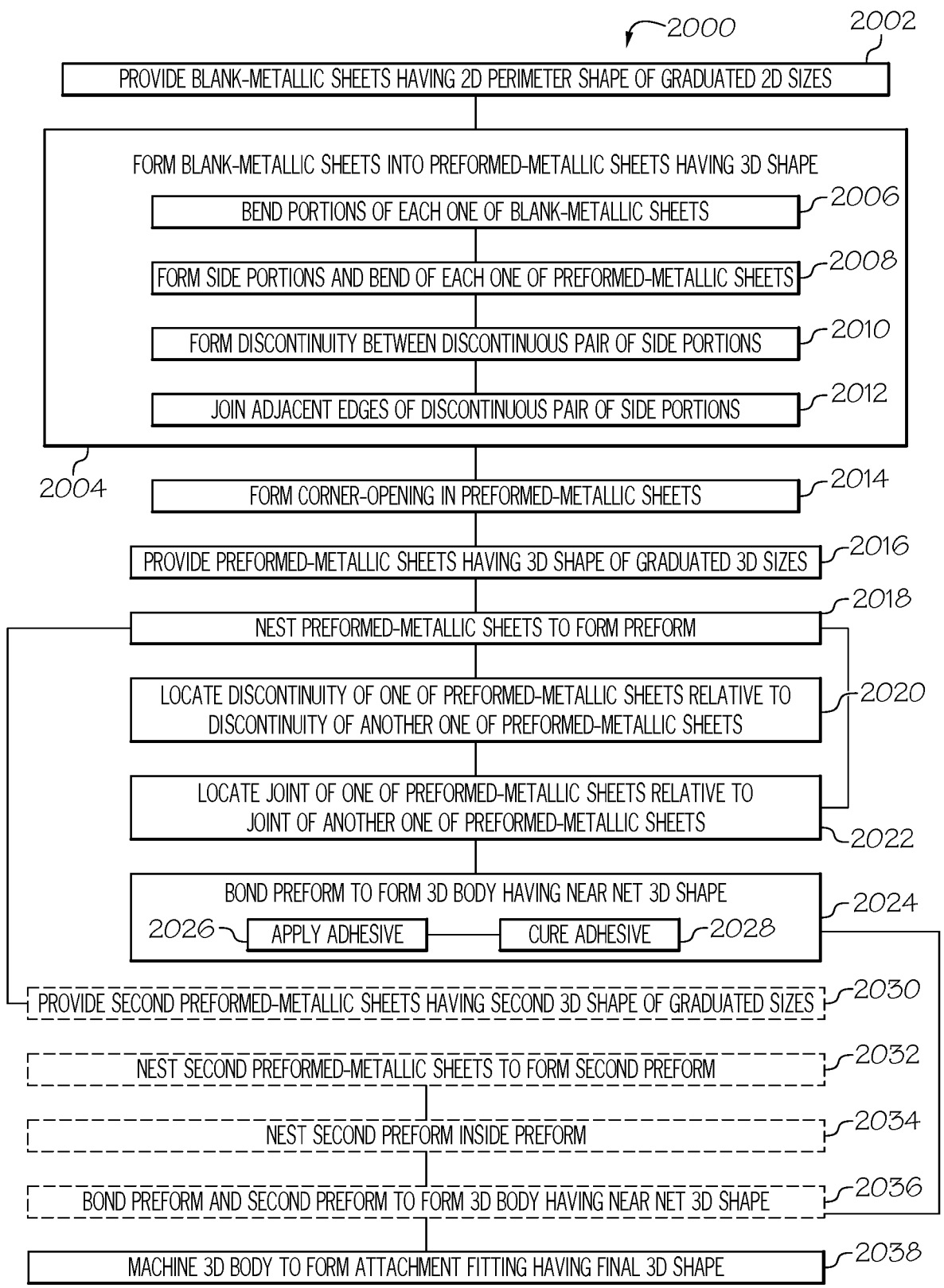
FIG. 27 is a flow diagram of an example of a method of forming an attachment fitting.

Referring generally to FIGS. 1-25 and particularly to FIG. 27, examples of a method 2000 of forming the attachment fitting 112 for the structure 114 are disclosed. The attachment fitting 112 made according to the method 1000 includes the plurality of preformed metallic sheets 102 of graduated three-dimensional sizes 122 having the three-dimensional shape 106 nested together to form the preform 136. The preform 136 is bonded together to form the three-dimensional body 104 having the near-net three-dimensional shape 138. The three-dimensional body 104 is machined into the attachment fitting 112 having the final three-dimensional shape 140

Referring generally to FIGS. 1-3B and 7A-9B and particularly to FIG. 27, in an example, the method 2000 includes a step of (block 2002) providing the plurality of blank-metallic sheets 128 having the two-dimensional perimeter shape 120 of graduated two-dimensional sizes 132. The method 2000 also includes a step of (block 2004) forming the plurality of blank-metallic sheets 128 into the plurality of preformed metallic sheets 102 having the three-dimensional shape 106.

Referring generally to FIGS. 1 and 27, in an example, the method 2000 includes a step of forming each one of the plurality of blank-metallic sheets 128 into the two-dimensional perimeter shape 120 by at least one of stamping, punching, and cutting at least one flat sheet 134 of a metallic material 116. In an example, the step of forming the plurality of blank-metallic sheets 128 into the two-dimensional perimeter shape 120 is performed using the two-dimensional-shaping apparatus 148 (FIG. 1).

Referring generally to FIGS. 1 and 27, in an example, according to the method 2000, the step of (block 2004) forming the plurality of blank-metallic sheets 128 into the plurality of preformed metallic sheets 102 having the three-dimensional shape 106 includes a step of forming at least one bend 130 in each one of the plurality of blank-metallic sheets 128 by at least one of bending, roll forming, draw forming, and stretch forming. In an example, the step of (block 2004) forming the plurality of blank-metallic sheets 128 into the plurality of preformed metallic sheets 102 having the three-dimensional shape 106 is performed using the three-dimensional-shaping apparatus 150 (FIG. 1).

Referring generally to FIGS. 2A-3B and 5A-9B and particularly to FIG. 27, in an example, according to the method 2000, the step of (block 2004) forming the plurality of blank-metallic sheets 128 into the plurality of preformed metallic sheets 102 includes a step of (block 2006) bending at least one of a plurality of portions 158 of each one of the plurality of blank-metallic sheets 128 relative to at least another one of the plurality of portions 158 of each one of the plurality of blank-metallic sheets 128 and a step of (block 2008) forming a plurality of side portions 160 and a bend 130 between each continuous pair of the plurality of side portions 160 of each one of the plurality of preformed metallic sheets 102. The plurality of side portions 160 of the plurality of preformed metallic sheets 102 in the nested arrangement form the plurality of sides 162 of the attachment fitting 112. The bend 130 of the plurality of preformed metallic sheets 102 in the nested arrangement forms the bend 146 of the attachment fitting 112 between each continuous pair of the plurality of sides 162.

As illustrated in FIGS. 2A-3B and 6A, in an example, according to the method 2000, each one of the plurality of preformed metallic sheets 102 includes two side portions 160 (e.g., first side portion 160A and second side portion 160B) (FIGS. 2B and 3B). The attachment fitting 112 includes two sides 162 (e.g., first side 162A and second side 162B) (FIG. 6A).

As illustrated in FIGS. 7A-8B, 10, and 11, in an example, according to the method 2000, each one of the plurality of preformed metallic sheets 102 includes three side portions 160 (e.g., first side portion 160A, second side portion 160B, and third side portion 160C) (FIGS. 7B and 8B). The attachment fitting 112 includes three sides 162 (e.g., first side 162A, second side 162B, and third side 162C) (FIGS. 10 and 11).

As illustrated in FIG. 25, in an example, according to the method 2000, each one of the plurality of preformed metallic sheets 102 includes four side portions 160. The attachment fitting 112 includes four sides 162.

As illustrated in FIGS. 9A, 9B, and 12, in an example, each one of the plurality of preformed metallic sheets 102 includes five side portions 160 (e.g., first side portion 160A, second side portion (not visible in FIG. 9B), third side portion 160C, fourth side portion 160D, and fifth side portion 160E) (FIG. 9B). The attachment fitting 112 includes five sides 162 (e.g., first side 162A, second side (not visible in FIG. 12), third side 162C, fourth side 162D, and fifth side 162E) (FIG. 12).

Referring generally to FIGS. 2A-12, and particularly to FIG. 27, in an example, according to the method 2000, the step of (block 2004) forming the plurality of blank-metallic sheets 128 into the plurality of preformed metallic sheets 102 includes a step of bending a first portion 158A of each one of the plurality of blank-metallic sheets 128 relative to a second portion 158B of each one of the plurality of blank-metallic sheets 128 and a step of forming a corresponding one of the plurality of preformed metallic sheets 102 that includes the first side portion 160A, the second side portion 160B, and the first bend 130A between the first side portion 160A and the second side portion 160B. The first side portions 160A of the plurality of preformed metallic sheets 102 in the nested arrangement form the first side 162A of the attachment fitting 112. The second side portions 160B of the plurality of preformed metallic sheets 102 in the nested arrangement form the second side 162B of the attachment fitting 112. The first bends 130A of the plurality of preformed metallic sheets 102 in the nested arrangement form the first bend 146A of the attachment fitting 112 between the first side 162A and the second side 162B.

In an example, according to the method 2000, the step of (block 2004) forming the plurality of blank-metallic sheets 128 into the plurality of preformed metallic sheets 102 includes a step of bending a third portion 158C of each one of the plurality of blank-metallic sheets 128 relative to the second portion 158B of each one of the plurality of blank-metallic sheets 128 and a step of forming a corresponding one of the plurality of preformed metallic sheets 102 that includes the third side portion 160C and the second bend 130B between the second side portion 160B and the third side portion 160C. The third side portions 160C of the plurality of preformed metallic sheets 102 in the nested arrangement form the third side 162C of the attachment fitting 112. The second bends 130B of the plurality of preformed metallic sheets 102 in the nested arrangement form the second bend 146B of the attachment fitting 112 between the second side 162B and the third side 162C.

In an example, according to the method 2000, the step of (block 2004) forming the plurality of blank-metallic sheets 128 into the plurality of preformed metallic sheets 102 includes a step of bending a fourth portion 158D of each one of the plurality of blank-metallic sheets 128 relative to the second portion 158B of each one of the plurality of blank-metallic sheets 128 and a step of forming a corresponding one of the plurality of preformed metallic sheets 102 that includes the fourth side portion 160D and the third bend (not visible in FIG. 9B) between the second side portion 160B and the fourth side portion 160D. The fourth side portions 160D of the plurality of preformed metallic sheets 102 in the nested arrangement form the fourth side 162D of the attachment fitting 112. The third bends of the plurality of preformed metallic sheets 102 in the nested arrangement form the third bend (not visible in FIG. 12) of the attachment fitting 112 between the second side 162B and the fourth side 162D.

In an example, according to the method 2000, the step of (block 2004) forming the plurality of blank-metallic sheets 128 into the plurality of preformed metallic sheets 102 includes a step of bending a fifth portion 158E of each one of the plurality of blank-metallic sheets 128 relative to the second portion 158B of each one of the plurality of blank-metallic sheets 128 and a step of forming a corresponding one of the plurality of preformed metallic sheets 102 that includes the fifth side portion 160E and the fourth bend 130D between the second side portion 160B and the fifth side portion 160E. The fifth side portions 160E of the plurality of preformed metallic sheets 102 in the nested arrangement form the fifth side 162E of the attachment fitting 112. The fourth bends 130D of the plurality of preformed metallic sheets 102 in the nested arrangement form the fourth bend 146D of the attachment fitting 112 between the second side 162B and the fifth side 162E.

Referring generally to FIGS. 8A-9B and 11-14 and particularly to FIG. 27, in an example, according to the method

2000, the step of (block 2004) forming the plurality of blank-metallic sheets 128 into the plurality of preformed metallic sheets 102 includes a step of (block 2010) forming the discontinuity 164 between discontinuous pairs of the plurality of side portions 160 of each one of the plurality of preformed metallic sheets 102.

Referring generally to FIGS. 8A-9B and 11-14 and particularly to FIG. 27, in an example, according to the method 2000, the step of (block 2004) forming the plurality of blank-metallic sheets 128 into the plurality of preformed metallic sheets 102 includes a step of (block 2012) joining adjacent edges 166 of at least one discontinuous pair of the plurality of side portions 160 of at least one of the plurality of preformed metallic sheets 102 to form the joint 168.

Referring generally to FIGS. 8A-9B and 11-14 and particularly to FIG. 27, in an example, the method 2000 includes a step of (block 2014) forming the corner-opening 176 in each one of the plurality of preformed metallic sheets 102 at a corner defined by three adjacent ones of the plurality of side portions 160 of each one of the plurality of preformed metallic sheets 102. The corner-openings 176 of the plurality of preformed metallic sheets 102 in the nested arrangement form the corner-opening 178 of the attachment fitting 112.

Referring generally to FIGS. 1, 5A, 6A, and 10-12 and particularly to FIG. 27, in an example, the method 2000 includes a step of (block 2016) providing the plurality of preformed metallic sheets 102 having the three-dimensional shape 106 of graduated three-dimensional sizes 122. The method 2000 also includes a step of (block 2018) nesting the plurality of preformed metallic sheets 102 one inside another to form the preform 136.

Referring generally to FIGS. 13 and 14 and particularly to FIG. 27, in an example, the method 2000 includes a step of (block 2020) locating the discontinuity 164 of one of the plurality of preformed metallic sheets 102 at a non-zero angle relative to the discontinuity 164 of another one of the plurality of preformed metallic sheets 102.

Referring generally to FIGS. 13 and 14 and particularly to FIG. 27, in an example, the method 2000 includes a step of (block 2022) locating the joint 168 of one of the plurality of preformed metallic sheets 102 at a non-zero angle relative to the joint 168 of another one of the plurality of preformed metallic sheets 102.

Referring generally to FIG. 1 and particularly to FIG. 27, in an example, the method 2000 further includes a step of (block 2024) bonding the preform 136 together to form the three-dimensional body 104 having the near-net three-dimensional shape 138.

Referring generally to FIGS. 1 and 4-6B and particularly to FIG. 27, in an example, the method 2000 includes a step of (block 2026) applying the adhesive 118 between each adjacent pair of the plurality of preformed metallic sheets 102. The method 2000 also includes a step of (block 2028) curing the adhesive 118 using at least one of heat and pressure.

Referring generally to FIGS. 1-3B and 7A-9B and particularly to FIG. 27, in an example, according to the method 2000, each one of the plurality of preformed metallic sheets 102 includes at least one bend 130 in at least one dimension. In another example, according to the method 2000, each one of the plurality of preformed metallic sheets 102 includes the plurality of bends 130 in at least one dimension.

Referring generally to FIGS. 1, 6A, 10-12, 17, 18, 21, 22, and 25 and particularly to FIG. 27, in an example, according to the method 2000, the attachment fitting 112 includes at least one bend 146 in at least one dimension. In another example, according to the method 2000, the attachment fitting 112 includes the plurality of bends 146 in at least one dimension.

Referring generally to FIGS. 1 and 15-17 and particularly to FIG. 27, in an example, the method 2000 includes a step of (block 2030) providing a plurality of second preformed metallic sheets 170 having the second three-dimensional shape 172 of graduated three-dimensional sizes 122. The method 2000 also includes a step of (block 2032) nesting the plurality of second preformed metallic sheets 170 one inside another to form the second preform 174 (FIG. 15). The method 2000 further includes a step of (block 2034) nesting the second preform 174 inside the preform 136. The method 2000 additionally includes a step of (block 2036) bonding the preform 136 and the second preform 174 together to form the three-dimensional body 104 having the near-net three-dimensional shape 138 (FIG. 16).

Referring generally to FIGS. 16 and 17 and particularly to FIG. 27, in an example, the method 2000 includes a step of (block 2038) machining the three-dimensional body 104 (FIG. 16) to form the attachment fitting 112 having the final three-dimensional shape 140 (FIG. 17).

Figure 28:
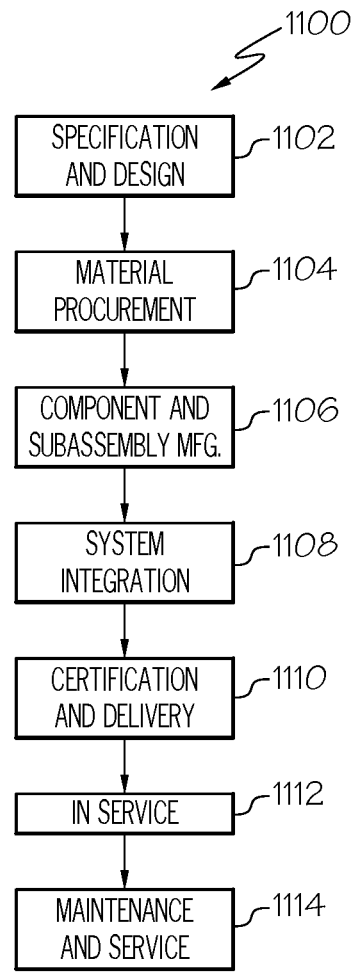
FIG. 28 is a flow diagram of an aircraft manufacturing and service methodology.

Examples of the laminated metallic structure 100 and the methods 1000 and 2000 disclosed herein may find use in a variety of potential applications, particularly in the transportation industry, including for example, aerospace applications. Referring now to FIGS. 28 and 29, examples of the laminated metallic structure 100 and the methods 1000 and 2000 may be used in the context of an aircraft manufacturing and service method 1100, as shown in the flow diagram of FIG. 28 and the aircraft 1200, as shown in FIG. 21. Aircraft applications may include forming at least one of the attachment fitting 112, the stiffener 142, and the frame 144 (FIG. 1) from the disclosed laminated metallic structure 100.

FIG. 29 is an illustrative example of the aircraft 1200. The aircraft 1200 includes an airframe 1202, a plurality of high-level systems 1204, and an interior 1206. Examples of the high-level systems 1204 include one or more of a propulsion system 1208, an electrical system 1210, a hydraulic system 1212, and an environmental system 1214. In other examples, the aircraft 1200 may include any number of other types of systems.

The aircraft 1200 illustrated in FIG. 29 is an example of an aircraft having one or more structures or components formed from the laminated metallic structure 100 and/or using the methods 1000 and 2000 disclosed herein. In an example, the primary structure 114 is a component of the aircraft 1200 or is an element of a larger assembly of the aircraft 1200. In an example, the primary structure 114 forms a part of the airframe 1202 of the aircraft 1200, such as a fuselage, a wing, a vertical stabilizer, a horizontal stabilizer, another structure of the aircraft 1200, such as a stringer, a spar, a rib, a wing box, or a part of the interior 1206. In an example, the laminated metallic structure 100 is used to form an attachment fitting 112 of the aircraft 1200. In an example, the laminate metallic structure 100 is used to form the primary structure 114.

As illustrated in FIG. 28, during pre-production, the method 1100 may include specification and design of aircraft 1200 (block 1102) and material procurement (block 1104). During production of the aircraft 1200, component and subassembly manufacturing (block 1106) and system integration (block 1108) of the aircraft 1200 may take place. Thereafter, the aircraft 1200 may go through certification and delivery (block 1110) to be placed in service (block 1112). Implementation of the laminated metallic structure 100 and the methods 1000 and 2000 may form a portion of component and subassembly manufacturing (block 1106) and/or system integration (block 1108). Routine maintenance and service (block 1114) may include modification, reconfiguration, refurbishment, etc. of one or more systems of the aircraft 1200.

Each of the processes of the method 1100 illustrated in FIG. 28 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

Examples of the laminated metallic structure 100 and the methods 1000 and 2000 shown or described herein may be employed during any one or more of the stages of the manufacturing and service method 1100 shown in the flow diagram illustrated by FIG. 28. For example, components or subassemblies, such as those that include structures or attachment fittings made of the laminated metallic structure 100, corresponding to component and subassembly manufacturing (block 1106) may be fabricated or manufactured in a manner similar to components or subassemblies produced while the aircraft 1200 (FIG. 29) is in service (block 1112). Also, one or more examples of the laminated metallic structure 100 and the methods 1000 and 2000 described herein may be utilized during production (block 1108 and block 1010). Similarly, one or more examples of the laminated metallic structure 100 and the methods 1000 and 2000 described herein may be utilized, for example and without limitation, while the aircraft 1200 is in service (block 1112) and during maintenance and service (block 1114).

Although an aerospace example is shown, the examples and principles disclosed herein may be applied to other industries, such as the automotive industry, the space industry, the construction industry, and other design and manufacturing industries. Accordingly, in addition to aircraft, the examples and principles disclosed herein may apply to other vehicle structures (e.g., land vehicles, marine vehicles, space vehicles, etc.) and stand-alone structures.

As used herein, a system, apparatus, device, structure, article, element, component, or hardware "configured to" perform a specified function is indeed capable of performing the specified function without any alteration, rather than merely having potential to perform the specified function after further modification. In other words, the system, apparatus, device, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, device, structure, article, element, component, or hardware described as being "configured to" perform a particular function may additionally or alternatively be described as being "adapted to" and/or as being "operative to" perform that function.

For the purpose of this disclosure, the terms "coupled," "coupling," and similar terms refer to two or more elements that are joined, linked, fastened, attached, connected, put in communication, or otherwise associated (e.g., mechanically, electrically, fluidly, optically, electromagnetically) with one another. In various examples, the elements may be associated directly or indirectly. As an example, element A may be directly associated with element B. As another example, element A may be indirectly associated with element B, for example, via another element C. It will be understood that not all associations among the various disclosed elements are necessarily represented. Accordingly, couplings other than those depicted in the figures may also exist.

As used herein, the phrase "at least one of", when used with a list of items, means different combinations of one or more of the listed items may be used and only one of each item in the list may be needed. For example, "at least one of item A, item B, and item C" may include, without limitation, item A or item A and item B. This example also may include item A, item B, and item C, or item B and item C. In other examples, "at least one of" may be, for example, without limitation, two of item A, one of item B, and ten of item C; four of item B and seven of item C; and other suitable combinations.

As used herein, the terms "approximately," "about," and "generally" refer to or represent a condition that is close to, but not exactly, the stated condition that still performs the desired function or achieves the desired result. As an example, the terms "approximately," "about," and "generally" refer to a condition that is within an acceptable predetermined tolerance or accuracy. For example, the terms "approximately," "about," and "generally" refer to a condition that is within 10% of the stated condition. However, the terms "approximately," "about," and "generally" do not exclude a condition that is exactly the stated condition.

In FIGS. 1 and 29, referred to above, the blocks may represent functional elements, features, or components thereof and lines connecting the various blocks do not imply any particular structure. Accordingly, modifications, additions and/or omissions may be made to the illustrated structure. Additionally, those skilled in the art will appreciate that not all elements described and illustrated in FIGS. 1-25, referred to above, need be included in every example and not all elements described herein are necessarily depicted in each illustrative example. Unless otherwise explicitly stated, the schematic illustrations of examples depicted in FIGS. 1-25, referred to above, are not meant to imply structural limitations with respect to the illustrative example. Rather, although one illustrative structure is indicated, it is to be understood that the structure may be modified when appropriate.

In FIGS. 26-28, referred to above, the blocks may represent operations, steps, and/or portions thereof and lines connecting the various blocks do not imply any particular order or dependency of the operations or portions thereof. It will be understood that not all dependencies among the various disclosed operations are necessarily represented. FIGS. 26-28 and the accompanying disclosure describing the operations of the disclosed methods set forth herein should not be interpreted as necessarily determining a sequence in which the operations are to be performed. Rather, although one illustrative order is indicated, it is to be understood that the sequence of the operations may be modified when appropriate. Accordingly, modifications, additions and/or omissions may be made to the operations illustrated and certain operations may be performed in a different order or simultaneously. Additionally, those skilled in the art will appreciate that not all operations described need be performed.

Further, references throughout the present specification to features, advantages, or similar language used herein do not imply that all of the features and advantages that may be realized with the examples disclosed herein should be, or are in, any single example. Rather, language referring to the features and advantages is understood to mean that a specific feature, advantage, or characteristic described in connection with an example is included in at least one example. Thus, discussion of features, advantages, and similar language used throughout the present disclosure may, but do not necessarily, refer to the same example.

The described features, advantages, and characteristics of one example may be combined in any suitable manner in one or more other examples. One skilled in the relevant art will recognize that the examples described herein may be practiced without one or more of the specific features or advantages of a particular example. In other instances, additional features and advantages may be recognized in certain examples that may not be present in all examples. Furthermore, although various examples of the laminated metallic structure 100 and the methods 1000 and 2000 have been shown and described, modifications may occur to those skilled in the art upon reading the specification. The present application includes such modifications and is limited only by the scope of the claims.

What is claimed is:

1. A laminated metallic structure, comprising:
    preformed metallic components that are nested one inside another and bonded together to form a preform, wherein:
    the preformed metallic components have three-dimensional shapes of graduated sizes;
    each one of the preformed metallic components comprises:
        a first side portion;
        a second side portion extending from and continuous with the first side portion;
        a third side portion extending from and continuous with the second side portion; and
        a corner opening located at a corner shared by the first side portion, the second side portion, and the third side portion;
    at least a portion of the second side portion is substantially perpendicular to at least a portion of the first side portion; and
    at least a portion of the third side portion is substantially perpendicular to at least a portion of the second side portion and to at least a portion of the first side portion.

2. The laminated metallic structure of claim 1, wherein each one of the preformed metallic components is adhesively bonded to an adjacent one of the preformed metallic components to form a three-dimensional body.

3. The laminated metallic structure of claim 1, wherein each one of the preformed metallic components is formed from a corresponding one of blank-metallic sheets having a two-dimensional perimeter shapes of graduated two-dimensional sizes that are bent into the three-dimensional shapes.

4. The laminated metallic structure of claim 1, wherein:
    the preform has a near-net three-dimensional shape; and
    the preform is machined into a final three-dimensional shape that is different than the near-net three-dimensional shape.

5. The laminated metallic structure of claim 1, wherein the laminated metallic structure is an attachment fitting of a structure.

6. The laminate metallic structure of claim 1, wherein each one of the preformed metallic components further comprises a discontinuity between discontinuous pairs of the first side portion, the second side portion, and the third side portion.

7. The laminate metallic structure of claim 1, wherein each one of the preformed metallic components further comprises a joint between adjacent edges of at least one discontinuous pair of the first side portion, the second side portion, and the third side portion.

8. The laminate metallic structure of claim 1, wherein each one of the preformed metallic sheets further comprises a discontinuity between discontinuous pairs of the first side portion, the second side portion, and the third side portion and a joint between adjacent edges of at least one discontinuous pair of the first side portion, the second side portions and the third side portion.

9. The laminated metallic structure of claim 1, further comprising second preformed metallic components having second three-dimensional shapes of second graduated sizes, wherein the second preformed metallic components are nested one inside another and bonded together to form a second preform.

10. The laminated metallic structure of claim 9, wherein:
    the second preform is nested inside the preform;
    the preform and the second preform are bonded together to form a three-dimensional body having a near-net three-dimensional shape;
    the three-dimensional body is machined into an attachment fitting of a structure; and
    the attachment fitting has a final three-dimensional shape that is different than the near-net three-dimensional shape.

11. The laminated metallic structure of claim 1, wherein the preformed metallic components are nested so that the corner opening of each one of the preformed metallic components is substantially aligned with the corner opening of an adjacent one of the preformed metallic components.

12. The laminated metallic structure of claim 1, wherein:
    each one of the preformed metallic components further comprises:
        a fourth side portion extending from and continuous with the second side portion; and
        a second-corner opening located at a second corner that is shared by the first side portion, the second side portion, and the fourth side portion; and
    at least a portion of the fourth side portion is substantially perpendicular to at least a portion of the second side portion and to at least a portion of the first side portion.

13. The laminated metallic structure of claim 12, wherein the preformed metallic components are nested so that the second-corner opening of at least one of the preformed metallic components is substantially aligned with the second-corner opening of an adjacent one of the preformed metallic components.

14. The laminated metallic structure of claim 1, further comprising an adhesive disposed between each one of the preformed metallic components and an adjacent one of the preformed metallic components.

15. A laminated metallic structure, comprising preformed metallic components that are nested one inside another and bonded together to form a preform, wherein:
    the preformed metallic components have three-dimensional shapes of graduated sizes;
    each one of the preformed metallic components comprises:
        a first side portion;
        a second side portion extending from and continuous with the first side portion; and a third side portion extending from and continuous with the second side portion;

at least a portion of the second side portion is substantially perpendicular to at least a portion of the first side portion;

at least a portion of the third side portion is substantially perpendicular to at least a portion of the second side portion and to at least a portion of the first side portion; and the third side portion is discontinuous with the first side portion, adjacent edges of the first side portion and the third side portion are parallel to each other; and the preformed metallic components are nested so that the adjacent edges of the first side portion and the third side portion of at least one of the preformed metallic components are substantially perpendicular to the adjacent edges of the first side portion and the third side portion of at least another one of the preformed metallic components.

16. The laminated metallic structure of claim 15, wherein each one of the preformed metallic components further comprises a corner opening located at a corner shared by the first side portion, the second side portion, and the third side portion.

17. The laminated metallic structure of claim 15, wherein:
each one of the metallic preformed components further comprises a fourth side portion extending from and continuous with the second side portion;

at least a portion of the fourth side portion is substantially perpendicular to at least a portion of the second side portion and to at least a portion of the first side portion;

the fourth side portion is discontinuous with the first side portion;

adjacent edges of the first side portion and the fourth side portion are parallel to each other; and the preformed metallic components are nested so that the adjacent edges of the first side portion and the fourth side portion of at least one of the preformed metallic components are substantially perpendicular to the adjacent edges of the first side portion and the fourth side portion of at least another one of the preformed metallic components.

18. A laminated metallic structure, comprising preformed metallic components that are nested one inside another and bonded together to form a preform, wherein:
the preformed metallic components have three-dimensional shapes of graduated sizes;

each one of the preformed metallic components comprises:
a first side portion;
a second side portion extending from and continuous with the first side portion;
a third side portion extending from and continuous with the second side portion; and
a joint between adjacent edges of the first side portion and the third side portion;

at least a portion of the second side portion is substantially perpendicular to at least a portion of the first side portion;

at least a portion of the third side portion is substantially perpendicular to at least a portion of the second side portion and to at least a portion of the first side portion;

the third side portion is discontinuous with the first side portion;

the adjacent edges of the first side portion and the third side portion are parallel to each other; and the preformed metallic components are nested so that the joint between the adjacent edges of the first side portion and the third side portion of at least one of the preformed metallic components is substantially perpendicular to the joint between the adjacent edges of the first side portion and the third side portion of at least another one of the preformed metallic components.

19. The laminated metallic structure of claim 18, wherein each one of the preformed metallic components further comprises a corner opening located at a corner shared by the first side portion, the second side portion, and the third side portion.

20. The laminated metallic structure of claim 18, wherein:
each one of the metallic preformed components further comprises:
a fourth side portion extending from and continuous with the second side portion; and
a second joint between adjacent edges of the first side portion and the fourth side portion;

at least a portion of the fourth side portion is substantially perpendicular to at least a portion of the second side portion and to at least a portion of the first side portion;

the fourth side portion is discontinuous with the first side portion; and the adjacent edges of the first side portion and the fourth side portion are parallel to each other; and the preformed metallic components are nested so that the second joint between the adjacent edges of the first side portion and the fourth side portion of at least one of the preformed metallic components is substantially perpendicular to the second joint between the adjacent edges of the first side portion and the fourth side portion of at least another one of the preformed metallic components.

* * * * *